(12) United States Patent
Brackley et al.

(10) Patent No.: US 8,962,084 B2
(45) Date of Patent: Feb. 24, 2015

(54) METHODS OF APPLYING A LAYER OF MATERIAL TO A NON-PLANAR GLASS SHEET

(75) Inventors: Douglas Edward Brackley, Horseheads, NY (US); Christopher Paul Daigler, Painted Post, NY (US); Mark Stephen Friske, Campbell, NY (US); Alexander Lakota, Kanona, NY (US)

(73) Assignee: Corning Incorporated, Corning, NY (US)

(*) Notice: Subject to any disclaimer, the term of this patent is extended or adjusted under 35 U.S.C. 154(b) by 9 days.

(21) Appl. No.: 13/485,347

(22) Filed: May 31, 2012

(65) Prior Publication Data

US 2013/0323415 A1 Dec. 5, 2013

(51) Int. Cl.
| | |
|---|---|
| B05D 3/00 | (2006.01) |
| B05D 3/12 | (2006.01) |
| B41M 5/00 | (2006.01) |
| C03C 17/00 | (2006.01) |
| C03B 23/025 | (2006.01) |
| C03B 23/035 | (2006.01) |
| B41M 1/34 | (2006.01) |
| B41M 1/12 | (2006.01) |

(52) U.S. Cl.
CPC ............... *B05D 3/12* (2013.01); *B41M 5/007* (2013.01); *C03C 17/002* (2013.01); *C03B 23/0256* (2013.01); *C03B 23/0355* (2013.01); *C03B 23/0357* (2013.01); *C03C 2218/119* (2013.01); *C03B 23/025* (2013.01); *B41M 1/12* (2013.01); *B41M 1/34* (2013.01); *B41M 5/0011* (2013.01); *B41M 5/0047* (2013.01); *B41M 5/0088* (2013.01)
USPC .......................................... 427/294; 427/171

(58) Field of Classification Search
CPC ...... B41M 5/007; B41M 5/0011; B41M 1/34; B41M 1/12; C03B 23/0256; C03B 23/0355; C03B 23/0357; C03B 23/025; C03C 17/002
See application file for complete search history.

(56) References Cited

U.S. PATENT DOCUMENTS

| | | | |
|---|---|---|---|
| 5,108,479 A | 4/1992 | Hirano | ..................... 65/60.52 |
| 7,182,019 B2 | 2/2007 | Cutcher et al. | ............... 101/123 |
| 7,908,885 B2 | 3/2011 | Devitt | ........................... 65/106 |
| 2002/0157246 A1* | 10/2002 | Ogimoto | ....................... 29/832 |
| 2005/0089691 A1 | 4/2005 | Noguchi et al. | ............ 428/426 |

(Continued)

FOREIGN PATENT DOCUMENTS

WO WO2010/084272 7/2010 ............... B41J 3/407

OTHER PUBLICATIONS

International Search Report and Written Opinion, dated Aug. 27, 2013, International Application No. PCT/US2013/043502.

*Primary Examiner* — Dah-Wei D Yuan
*Assistant Examiner* — Nga Leung V Law
(74) *Attorney, Agent, or Firm* — Ryan T. Hardee

(57) ABSTRACT

Methods apply a layer of material to a glass sheet having a non-planar shape. The methods can each include the step of providing the glass sheet having an initial non-planar shape including a thickness defined between a first sheet surface and a second sheet surface. The method further includes the step of at least partially flattening the glass sheet into an application shape. The method further includes the step of applying the layer of material to the first sheet surface while the glass sheet is in the application shape. The method then includes the step of releasing the glass sheet to relax into a post non-planar shape.

26 Claims, 14 Drawing Sheets

(56) References Cited

U.S. PATENT DOCUMENTS

| | | | |
|---|---|---|---|
| 2006/0126050 A1* | 6/2006 | Momose | 355/72 |
| 2008/0229944 A1 | 9/2008 | Koenig et al. | 101/126 |
| 2009/0101027 A1 | 4/2009 | Goetz et al. | 101/123 |
| 2009/0303427 A1* | 12/2009 | Kondo et al. | 349/153 |
| 2010/0098917 A1 | 4/2010 | Lyon | 428/195.1 |
| 2011/0094267 A1* | 4/2011 | Aniolek et al. | 65/91 |
| 2011/0209634 A1* | 9/2011 | Sabia et al. | 101/129 |

\* cited by examiner

METHODS OF APPLYING A LAYER OF MATERIAL TO A NON-PLANAR GLASS SHEET

BACKGROUND

1. Field of the Invention

The present invention relates generally to methods of applying a layer of material and, more particularly, to methods of applying a layer of material to a non-planar glass sheet.

2. Technical Background

It is known to use a three-dimensional ("3D") printing device to print a three-dimensional feature on a three-dimensional sheet of glass. However, such 3D printing devices can increase the time and cost of processing the glass sheet and may not produce a high quality print due to the inherent limitations of 3D printing devices.

SUMMARY

In one example aspect, methods are provided for applying a layer of material to a glass sheet having a non-planar shape. The method includes the step (I) of providing the glass sheet having an initial non-planar shape including a thickness defined between a first sheet surface and a second sheet surface. The method further includes the step (II) of at least partially flattening the glass sheet into an application shape. The method further includes the step (III) of applying the layer of material to the first sheet surface while the glass sheet is in the application shape. The method then includes the step (IV) of releasing the glass sheet to relax into a post non-planar shape.

In accordance with one example of the aspect, step (II) substantially flattens the glass sheet such that the application shape is substantially planar.

In accordance with another example of the aspect, step (II) flattens the glass to an extent sufficient to enable step (III) of applying of the layer of material to the first sheet surface while the glass sheet is in the application shape by at least one of screen printing or ink jet printing.

In yet another example of the aspect, the method further comprises the step of applying fluid pressure to the glass sheet to maintain the glass sheet in the application shape during step (III).

In still another example of the aspect, step (II) includes the step of applying fluid pressure to the glass sheet to at least partially flatten the glass sheet into the application shape.

In another example of the aspect, step (II) includes the step of operating a plurality of fluid ports to apply fluid pressure to the glass sheet to at least partially flatten the glass sheet into the application shape.

In another example of the aspect, the method further includes the step of independently operating the plurality of fluid ports to selectively apply different corresponding pressures to the glass sheet to at least partially flatten the glass sheet during step (II).

In yet another example of the aspect, the method further comprises the step of applying a positive pressure to the first sheet surface to push the glass sheet to at least partially flatten the glass sheet into the application shape.

In a further example of the aspect, the method further comprises the step of applying a negative pressure to the second sheet surface to pull the glass sheet to at least partially flatten the glass sheet into the application shape.

In a further example of the aspect, step (II) includes mechanically engaging the glass sheet with a mechanical assist to at least partially assist in at least partially flattening the glass sheet into the application shape.

In still a further example of the aspect, the method further comprises the step of moving the mechanical assist out of engagement with the glass sheet such that a fluid pressure maintains the glass sheet in the application shape during step (III).

In another example of the aspect, the method further comprises the step of providing a vacuum plate with a shaping surface, wherein step (II) includes the step of vacuum forming the glass sheet against shaping surface of the vacuum plate to at least partially flatten the glass sheet into the application shape.

In still another example of the aspect, the shaping surface of the vacuum plate is substantially flat, such that step (II) includes vacuum forming the glass sheet against the shaping surface into the application shape that is substantially planar.

In yet another example of the aspect, the method further comprises the step of providing the vacuum plate with a seal circumscribing the shaping surface of the vacuum plate and defining a vacuum pocket, wherein step (II) includes vacuum forming the glass sheet within the vacuum pocket.

In one example of the aspect, the glass sheet is provided with an interrupted interior surface including at least one opening that is sealed when forming the glass sheet within the vacuum pocket.

In another example of the aspect, the opening is sealed with an interior seal when forming the glass sheet within the vacuum pocket.

In a further example of the aspect, step (IV) provides the post non-planar shape with substantially the same shape as the initial non-planar shape.

In still a further example of the aspect, the step (I) provides the glass sheet as an ion-exchange strengthened glass sheet in the initial non-planar shape.

In another further example of the aspect, step (IV) comprises slowing the rate that the glass sheet is relaxed into the post non-planar shape.

In another example of the aspect, the method further comprises the step of applying a resistance pressure to slow relaxation of the glass sheet into the post non-planar shape during step (IV).

In still another example of the aspect, the method also includes the step of calculating a critical relaxing velocity of the glass sheet, wherein the step (IV) slows the rate that the glass sheet is relaxed such that the glass sheet does not reach the critical relaxing velocity.

In another example of the aspect, the method further comprises the step of calculating a critical flattening velocity of the glass sheet, wherein the step (II) controls the process of at least partially flattening the glass sheet such that the glass sheet does not reach the critical flattening velocity.

In yet another example of the aspect, the method further comprises the step of calculating a critical application shape, wherein step (II) at least partially flattens the glass sheet into an application shape that does not reach the critical application shape.

In still another example of the aspect, the method further comprises the step of providing a printing device, wherein step (III) applies the layer of material to the first surface of the glass sheet with the printing device.

In yet another example of the aspect, the printing device is provided that is not configured to apply a layer of material to the first surface of the glass sheet when the glass sheet is in the initial non-planar shape.

In an additional example of the aspect, step (I) provides one of the first and second sheet surface as a concave surface and the other of the first and second sheet surface as a convex surface.

In still another example of the aspect, the glass sheet is provided with an interrupted interior surface including at least one opening.

In yet another example of the aspect, the opening is entirely closed within an outer periphery of the glass sheet.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
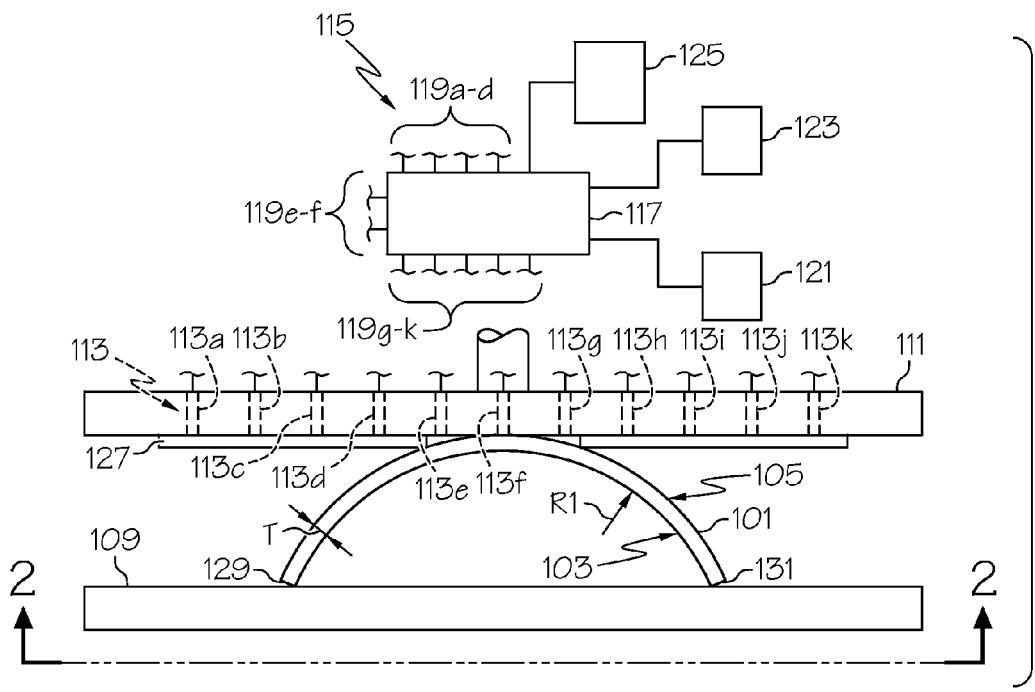
FIG. 1 is a schematic view of one example method step of providing a glass sheet having an initial non-planar shape prior to the step of at least partially flattening the glass sheet into an application shape.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Methods of the disclosure are provided for applying a layer of material to a glass sheet having a non-planar shape. The layer of material can comprise a liquid, paste or other viscous material, slurry, ink, paint, printable material, conductive material, or other material configured to be applied as a layer of material to the glass sheet. The layer of material can provide the glass sheet with various functional and/or decorative attributes. For example, the layer of material may provide the glass sheet with a heating element and/or at least a portion of an electrical circuit. In further examples, the layer of material may provide the glass sheet with a fluorescent or photo luminescent layer for functional and/or decorative features. In further examples, the layer of material may provide the glass sheet with colored (e.g., black) borders, faded dot patterns, polygonal patterns (e.g., hexagon patterns), or the like. In some of the above-referenced and further examples, the layer of material can provide the glass sheet with decorative and/or functional indicia.

The glass sheet provided with the methods of the disclosure can comprise a wide range of materials such as soda lime glass or a strengthened glass sheet such as an ion-exchange strengthened glass sheet. In just one example, aspects of the disclosure may be used with IOX Corning® Gorilla® glass although other glass materials may be used in further examples. Moreover, the glass sheets of the provided in accordance with aspects of the disclosure are preformed as a non-planar glass sheet. As such, application of the layer of material can be carried out after the glass sheet is formed with the non-planar shape configuration.

The glass sheets may have a wide range of initial non-planar shapes. For example, FIG. 1 shows just one schematic example of a non-planar glass sheet 101 with a single radius "R1" of curvature although biaxial radius of curvature or other non-planar shapes may be provided in further examples. For ease of discussion, the illustrated radius of curvature "R1" is relatively small with respect to the overall dimensions of the non-planar glass sheet 101 with the understanding that larger (or even smaller) radius of curvature may be used in further examples. For instance, in one example, methods of the disclosure can be carried out with the radius of curvature "R1" being greater than or equal to 500 mm, such as from about 1 meter to about 8 meters, such as from about 2 meters to about 4 meters. For example, methods of the disclosure can be carried out with the radius of curvature "R1" being greater or equal to about 500 mm, such as from about 1 meter to about 2 meters, such as from about 2 meters to about 4 meters, such as from about 4 meters to about 8 meters. Still further, methods of the disclosure may use glass sheets with the radius of curvature "R1" less than 500 mm in further examples.

Figure 2:
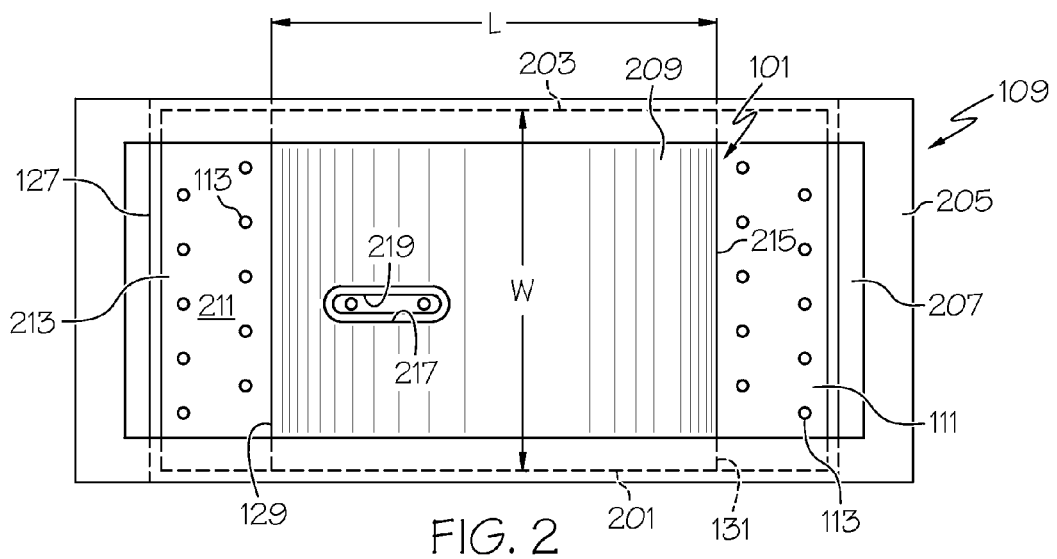
FIG. 2 is a bottom view of the non-planar glass sheet being placed on a support frame along line 2-2 of FIG. 1.
Figure 3:
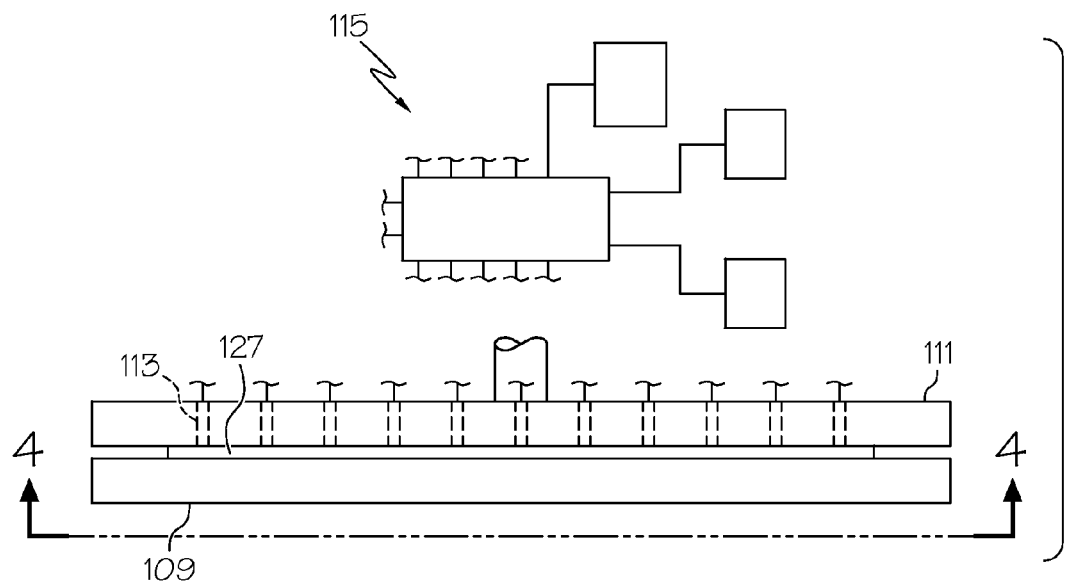
FIG. 3 illustrates the non-planar glass sheet being flattened into a substantially planar application shape.

The glass sheets can also have various sizes in accordance with aspects of the disclosure. For example, as shown in FIG. 1, the non-planar glass sheet 101 can include a thickness "T" defined between a first sheet surface 103 and a second sheet surface 105. The thickness "T" can be less than or equal to 3 mm such as from about 3 mm to about 0.1 mm such as from about 2 mm to about 1 mm. For instance, the thickness "T" can be from about 3 mm to about 2 mm, such as from about 2 mm to about 1 mm, such as from about 1 mm to about 0.1. mm. Still further, the thickness "T" may be larger than 3 mm in further examples. Moreover, the glass sheets may be provided with various overall lengths and widths. For example, as shown in FIG. 2, the non-planar glass sheet 101 can include a length "L" and/or width "W" of greater than 100 mm, such as from about 100 mm to about 1500 mm such as from about 500 mm to about 1000 mm. For instance, the length "L" and/or width "W" can be from about 100 mm to about 500 mm, such as from about 500 mm to about 1000 mm, such as from about 1000 mm to about 1500 mmm. Still further, the length "L" and/or width "W" can be less than 100 mm in further examples.

Methods of the disclosure are particularly useful for application of the layer of material to the glass sheet that is preformed to include a non-planar (i.e., 3 dimensional "3D") shape as discussed above. Methods of the disclosure allow 2 dimensional ("2D") layer application techniques to be used with glass sheets formed with a non-planar "3D" shape that may otherwise require 3 dimensional ("3D") layer application techniques to apply the layer of material. As such, methods of the disclosure can reduce printing costs, increase printing quality, reduce printing time and/or provide other benefits typically enjoyed when using 2D layer application procedures. Therefore, by way of aspects of the disclosure 2D layer application procedures may be used to apply 2D layers to a 3 dimensional ("3D") shaped non-planar glass sheet. Moreover, application of the layer of material may be carried out after initial formation of the glass sheet into the non-planar shape (i.e., 3D shape). As such, layers of material that may degrade at forming temperatures for shaping the glass sheet can be applied after forming the glass sheet into the desired non-planar shape. Moreover, properties of temperature-sensitive glass sheets (e.g., ion exchanged strength properties) can be maintained by application of a layer of material after forming the temperature-sensitive glass sheets into the desired non-planar shape. As such, the layer of material may be applied after formation of the non-planar shape to avoid reheating the glass sheet to a temperature that may otherwise damage the temperature-sensitive glass sheet.

Various methods of the disclosure described herein can begin with the step of providing the glass sheet 101 with the initial non-planar shape (schematically illustrated in FIG. 1). As shown, the non-planar glass sheet 101 includes a thickness "T" defined between the first sheet surface 103 and the second sheet surface 105. Although a single curvature having a radius of curvature "R1" is shown, complex curvatures may be provided in further examples. Moreover, the radius of curvature "R1" is shown to be substantially constant along the entire width "W". For example, as shown in FIG. 2, the width "W" of the glass sheet 101 is defined between opposite first and second edges 201, 203 wherein the radius of curvature "R1" is substantially the same along the width from the first edge 201 to the second edge 203. In such examples, as shown, the glass sheet 101 can be considered a circular cylindrical segment. At least one of the first and second sheet surfaces can comprise a concave surface and the other of the first and second sheet surface as a convex surface. For example, as shown in FIG. 1, the first sheet surface 103 comprises a concave sheet surface while the second sheet surface 105 comprises a convex sheet surface with the thickness "T" defined between the first sheet surface 103 and the second sheet surface 105. In further examples, the first sheet surface 103 can comprise a convex sheet surface while the second sheet surface 105 can comprise a concave sheet surface. As such, methods of the disclosure can be carried out to apply the layer of material to either a concave or convex surface of the glass sheet 101 depending on the particular application.

Although not shown, in further examples, the radius of curvature at the first edge 201 may be larger or smaller than the radius of curvature at the second edge 203 wherein the radius changes along the width between the first edge 201 and the second edge 203. In such examples, the glass sheet 101 may be considered a frustoconical cylindrical segment. In further examples, the glass sheet 101 may comprise a spherical segment although other shapes may be provided in further examples.

Example embodiments of the disclosure further include the step of at least partially flattening the glass sheet 101 into an application shape. In one example, the glass sheet 101 is substantially flattened such that the application shape of the glass sheet 101 is substantially planar. Completely flattening the glass sheet 101 into a substantially planar application shape can be beneficial to allow wide application of various 2D layer application techniques.

FIGS. 1-4 illustrate just one schematic configuration that may be used to substantially flatten the non-planar glass sheet 101 such that the application shape of the glass sheet 101 is substantially planar. For example, as shown in FIGS. 1 and 2 the glass sheet 101 can be placed on a support frame 109. As shown in FIG. 2, the support frame 109 can include an outer support perimeter 205 configured have an inner edge defining an opening 207. As such, the glass sheet 101 can be supported at the edges 203, 201 while not engaging the remaining central portion 209 of the glass sheet 101. Therefore, in some embodiments, only the edge portions of the first sheet surface 103 are engaged while the remaining central portion 209 of the glass sheet 101 maintains a pristine surface for subsequent application of the layer of material. Although not shown in this particular embodiment, various other techniques such as air bearings or the like may alternatively be used to provide touchless support of substantially the entire first sheet surface 103.

Many examples of the present disclosure can include a vacuum plate that is substantially rigid or, in some examples, substantially flexible. For instance, the vacuum plate may comprise a substantially flat or a substantially curved rigid vacuum plate. In further examples, the vacuum plate may be substantially flexible and therefore configured to change shape during the step of at least partially flattening the glass sheet 101 into the application shape.

As with many examples of the disclosure, FIG. 1 illustrates a substantially rigid and substantially flat vacuum plate 111. As shown in FIG. 1, the vacuum plate 111 can include a plurality of fluid ports 113 that may facilitate the step of flattening the non-planar glass sheet 101 into the application shape and/or facilitate maintenance of the application shape during at least the subsequent step of applying the layer of material as discussed more fully below. As shown in FIG. 1, some examples may orient a plurality of fluid ports 113 in a row of fluid ports 113. Moreover, as shown in FIG. 2, the plurality of fluid ports 113 can be arranged as a plurality of rows to generate an array, such as a matrix, of fluid ports 113 to facilitate pressure manipulation of the shape and/or maintenance of a desired at least partially flattened shape of the glass sheet 101.

In some examples, the fluid ports 113 may be controlled by a fluid control apparatus 115. For instance, by way of illustration, each of the fluid ports 113*a-k* shown in FIG. 1 may be placed in fluid communication with a manifold 117 of the fluid control apparatus 115 by way of respective fluid conduits 119*a-k*. The manifold 117 can then include valves configured to selectively place each of the fluid ports 113*a-k* in communication with a positive pressure source 121 and/or a negative pressure source 123 to allow each of the fluid ports 113*a-k* to act as a negative pressure zone and/or a positive pressure zone. Moreover, the manifold 117 can selectively adjust the pressure at each fluid port 113*a-k* such that the magnitude of the pressure, whether positive or negative, can be controlled. Still further, the fluid control apparatus 115 can further include a controller 125 that may be in communication with the manifold 117 to provide a preselected pressure application at each of the fluid ports 113*a-k*.

With reference to FIG. 2, each of the fluid ports 113 can be independently controlled, for example, as discussed above. In further examples, the vacuum plate 111 can include pressure zones that each operate at a selective pressure. For example, each pressure zone may include any number of fluid ports 113 such that control of the pressure zones (e.g., that each may include a plurality of fluid ports 113) may be carried out by the fluid control apparatus 115.

As further shown in FIG. 1, the vacuum plate 111 may optionally be provided with a seal 127 that is shown broken away in the central portion of FIG. 1 for clarity. As apparent in FIG. 2, the optional seal 127 can circumscribe a shaping surface 211 of the vacuum plate 111 and defining a vacuum pocket 213 that may be designed to fit snuggly about the peripheral edges of the flattened glass sheet 101 as discussed more fully below.

Figure 4:
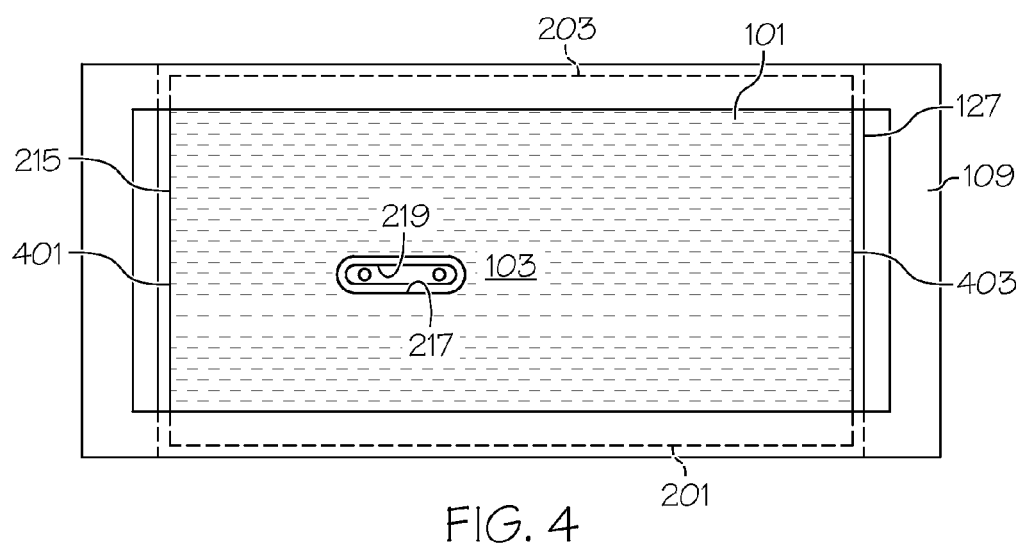
FIG. 4 is a bottom view of the flattened glass sheet extending along the support frame along line 4-4 of FIG. 3.

The non-planar glass sheet may extend uninterrupted about the entire outer periphery 215 defined by outer edges 129, 131, 201, 203 of the non-planar glass sheet. Alternatively, as shown in FIGS. 2 and 4, the non-planar glass sheet may have an interrupted interior surface including one or more openings 217 defined within an interior area of the glass sheet 101. For instance, as shown the openings 217, if provided, can be entirely closed within the outer periphery 215. If entirely closed within the outer periphery, no portion of the opening is open to any portion of the outer periphery 215 as shown in FIGS. 2 and 4. Although not shown, openings may also be open to the outer periphery. In such examples, the openings may intersect one the outer periphery, such as one of the outer edges 129, 131, 201, 203. As shown, in one example, the openings 217, if provided, can comprise an elongated slot although the openings can comprise other shapes such as circular, elliptical, rectangular (e.g., square), triangular, or other curvilinear and/or polygonal or other shapes in further examples. Moreover, the elongated slot 217 is shown extending parallel to the length "L" and perpendicular to the width "W" of the glass sheet 101 although the elongated slot or other opening configuration can be oriented in various alternative positions in further examples. For instance, although not shown, the elongated slot 217 can be oriented to extend parallel to the width "W" and perpendicular to the length "L" or other orientations relative to the length and width of the glass sheet.

If provided with the opening 217, as shown in FIGS. 2 and 4, the vacuum plate 111 may also optionally be provided with an interior seal 219 such as the illustrated ring-shaped seal although a solid plug or other seal configuration may be provided in further examples. The interior seal 219, if provided, can help facilitate defining the vacuum pocket 213 without leaking fluid through the openings 217 that may otherwise disrupt the vacuum achieved within the vacuum pocket 213. Still further, while the seal is illustrated as associated with the vacuum plate, in further examples a sealing material may be applied to the glass sheet itself For instance, a temporary plug may be applied to fill or otherwise temporarily cover the opening to help facilitate defining the vacuum pocket without leaking fluid through the openings.

As shown in FIGS. 1 and 2, the shaping surface 211 may be substantially planar to facilitate substantially flattening the glass sheet 101 into a planar glass sheet 101. In one example, the support frame 109 and the vacuum plate 111 can be moved relative to one another to at least mechanically assist in flattening of the glass sheet 101 into the substantially flat application shape. In one example, the support frame 109 may be moved toward the vacuum plate 111 to assist in flattening of the glass sheet 101. In further examples the vacuum plate 111 may be moved toward the support frame 109 to flatten the glass sheet 101. Furthermore, in some examples, the vacuum plate 111 and the support frame 109 can mechanically contact the glass sheet 101 to mechanically compress the glass sheet to flatten the glass sheet 101 into the substantially flat application shape. Once the glass sheet 101 reaches the application shape, the fluid ports 113 may be activated to act as suction ports to help maintain the glass sheet 101 in the application shape.

In further examples, the step of at least partially flattening the glass sheet 101 can include application of fluid pressure to the glass sheet 101 to at least partially flatten the glass sheet 101 into the application shape. For example, a negative pressure can be applied to the second sheet surface 105 to pull the glass sheet 101 to at least partially flatten the glass sheet 101 into the application shape. Moreover, in some examples, a plurality of fluid ports 113 to apply fluid pressure to the glass sheet 101 to at least partially flatten the glass sheet 101 into the application shape. Moreover, as discussed more fully below, the method can include the step of independently operating the plurality of fluid ports 113 to selectively apply different corresponding pressures to the glass sheet 101 to at least partially flatten the glass sheet 101.

For example, as shown in FIG. 1, the controller 125 can command the manifold 117 to place the fluid ports 113 in communication with the negative pressure source 123. As such, some or all of the fluid ports 113 may act as vacuum ports to apply a negative pressure to the second sheet surface 105 to pull the glass sheet 101 to at least partially flatten the glass sheet 101 into the substantially flat application shape shown in FIG. 4.

Referring to FIG. 1, in one example, the controller 125 may initially and independently activate one or more of the central fluid ports 113 to begin flattening the central portion against the substantially flat shaping surface 211. For discussion purposes, for example, the central ports 113*e-g* may first be activated or placed under a higher vacuum force than the remaining fluid ports. Next, once the central portion begins flattening, an outer pair 113*d*, 113*h* of fluid ports may be activated or placed under a higher vacuum force than the remaining fluid ports to continue a controlled flattening of the glass sheet 101. The remaining pairs can then be activated in sequence to complete the flattening. Controlling the flattening process can prevent the glass sheet 101 from flattening too quickly that may cause cracking or other failure of the glass sheet due to dynamic stresses that may otherwise develop. In one example, the method can include the step of calculating a critical flattening velocity of the glass sheet 101 where the glass sheet may develop unacceptable levels of dynamic stresses. Such calculation can be provided by solid modeling and/or comparison of measured features of the glass sheet with a database of glass sheets having known critical flattening velocities to predict the critical flattening velocity of the glass sheet 101 being processed. Once the critical flattening velocity is achieved, the controller 125 may selectively and independently control the vacuum being applied to each pressure zone, or even each fluid port 113 independently, to control the process of flattening the glass sheet such that the glass sheet 101 does not reach the critical flattening velocity.

As discussed above, the method step of at least partially flattening of the glass sheet 101 can include mechanically engaging the glass sheet 101 with a mechanical assist (e.g., support frame 109 and/or vacuum plate 111) to at least partially assist in at least partially flattening the glass sheet 101 into the application shape. In further examples, the step of at least partially flattening can be carried out solely by way of mechanical engagement by clamping together the support frame 109 and the vacuum plate 111.

As further discussed above, the step of at least partially flattening of the glass sheet 101 can include the step of vacuum forming the glass sheet 101 against shaping surface 211 of the vacuum plate 111 to at least partially flatten the glass sheet 101 into the application shape. Moreover, if the shaping surface is planer, such as the illustrated planar shaping surface 211, vacuum forming can force the glass sheet 101 against the substantially flat shaping surface 211 into the application shape that is substantially planar.

As discussed above, the step of at least partially flattening can be carried out solely by way of negative pressure being applied to the second sheet surface 105 to pull the glass sheet 101 to at least partially flatten the glass sheet into the application shape. In further examples, relative movement between the vacuum plate 111 and the support frame 109 can facilitate flattening of the glass sheet along with the negative pressure being applied to the second sheet surface 105.

Vacuum forming of the glass sheet 101 against the shaping surface 211 and/or maintenance of the glass sheet 101 in the application shape against the shaping surface 211 can be facilitated by the seal 127. Indeed, the first and second opposed edges 201, 203 and the third and fourth opposed edges 401, 403 shown in FIG. 4 can be snuggly fitted within the perimeter of the seal 127 to help maintain a suction seal as the glass sheet is vacuum formed within the vacuum pocket 213. Also, to enhance the ability to achieve or more quickly achieve a seal, a conformable material sheet may optionally be placed on top of the glass sheet during vacuum forming of the glass sheet against the shaping surface or a planar surface. Once the glass sheet is vacuum formed in place, the conformable sheet, if provided, can then be removed before applying the layer of material to the first sheet surface.

As mentioned previously, the support frame 109 can be designed to mechanically engage the glass sheet to facilitate a mechanical assist in flattening the glass sheet. In further examples, the support frame 109 may be replaced by an air bearing or other contactless configuration to apply a positive pressure to the first sheet surface 103 to push the glass sheet 101 to at least partially flatten the glass sheet 101 into the application shape. In such examples, a positive pressure, such as air jets, may be applied to the first sheet surface 103 that may act alone or together with the negative pressure being applied to the second sheet surface 105 to facilitate at least partial flattening of the glass sheet 101.

Figure 5:
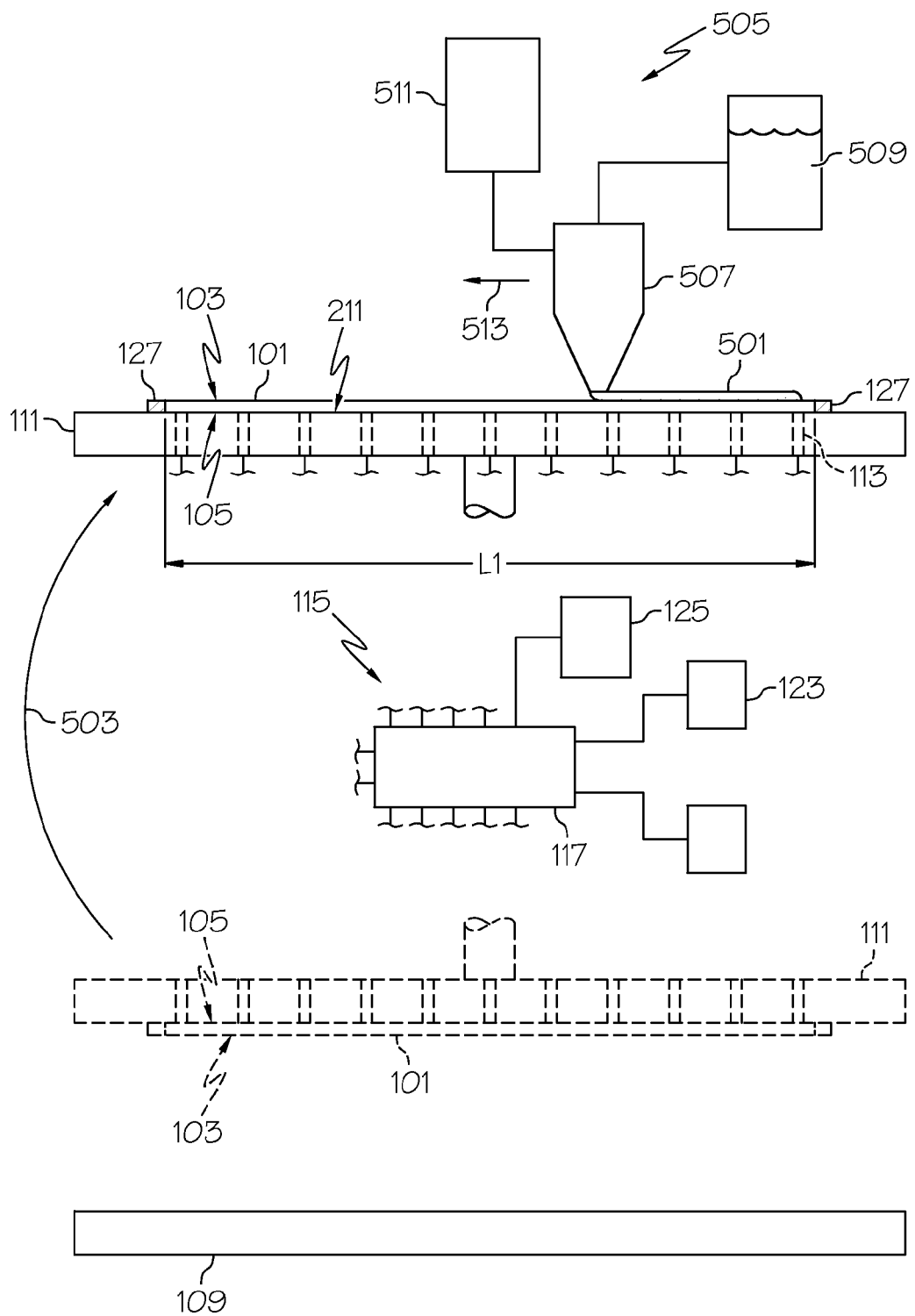
FIG. 5 illustrates a step of applying a layer of material to a first sheet surface of the glass sheet while the glass sheet is in the application shape.

FIG. 5 further illustrates an example method of moving the mechanical assist (e.g., support frame 109) out of engagement with the glass sheet 101 such that a fluid pressure (e.g., vacuum pressure from the fluid ports 113) maintains the glass sheet 101 in the application shape during a subsequent step of applying the layer of material as discussed below.

FIG. 5 illustrates on example of applying a layer of material 501 to the first sheet surface 103 while the glass sheet 101 is in the application shape. Initially, the vacuum plate 111 and the support frame 109 are moved away from one another until there is sufficient clearance. The vacuum plate 111 and glass sheet 101 are shown in hidden lines in FIG. 5 where there is sufficient clearance between the vacuum plate and the support frame to allow reorientation of the glass sheet 101. Then the vacuum plate 111 together with the glass sheet 101 vacuum formed to the shaping surface 211 of the vacuum plate are rotated along rotation direction 503 until the first sheet surface 103 is facing upwardly as shown in FIG. 5. Then the layer of material 501 may be applied to the first sheet surface 103. FIG. 5 illustrates a schematic view of a 2-D layer application apparatus 505 that may comprise a nozzle mechanism 507 configured to apply the material 509 (e.g., liquid, paste or other viscous material, slurry, ink, paint, conductive material, or other material) with the nozzle mechanism 507 as the nozzle mechanism is directed by controller 511 to move along the flattened length "L1" in direction 513. In one example, the nozzle mechanism 507 may print the layer of material by a wide range of techniques such as spraying, brushing, printing or the like. In one example, the layer application apparatus 505 may apply a layer of material to the first sheet surface 103 while the glass sheet 101 is in the application shape by at least one of screen printing or ink jet printing. Therefore, example methods may include providing the layer of material to the first surface of the glass sheet 101 with the printing device, spray device, or other material application device.

The schematic 2-D layer application apparatus 505 may be of a configuration that cannot be effectively used to print on 3-D surfaces. A 3-D surface is considered to be any surface that has more than a 6 mm deviation from the highest point to the lowest point of the glass sheet 101 throughout the printing path (e.g., along the flattened length "L1" as shown in FIG. 5). In one example, the printing device used to apply the layer of material is not configured to apply a layer of material to the first surface of the glass sheet 101 when the glass sheet 101 is in the initial non-planar shape. For instance, the non-planar glass sheet 101 illustrated in FIG. 1 can be curved such that the maximum vertical distance between the central portion of the non-planar glass sheet 101 and the outer edges 129, 131 is greater than 6 mm. In such a configuration, the 2-D layer application apparatus 505 is not configured to effectively print on the first sheet surface 103 of the non-planar glass sheet. However, once flattened, as further illustrated in FIG. 5, for example, there is negligible difference between the highest point and the lowest point of the glass layer since the glass sheet 101 has been substantially completely flattened into the planar shape shown in FIG. 5. As such, the 2-D layer application apparatus 505 may be used to effectively apply the layer of material 501 to the first sheet surface 103 of the glass sheet 101 since the maximum distance between extreme portions along the application length "L1" is less than 6 mm. As such, layer application techniques may be carried out with a 2-D layer application apparatus 505 that may not otherwise be used effectively to apply the layer of material when in the non-planar configuration shown in FIG. 1.

In one example, fluid pressure may be applied to the glass sheet 101 to maintain the glass sheet 101 in the application shape during the step of applying the layer of material as shown in FIG. 5. For instance, the controller 125 may send commands to the manifold 117 to maintain the fluid ports 113 in communication with the negative pressure source 123 to continue to vacuum form the glass sheet 101 to form against the substantially flat shaping surface 211 while the 2-D layer application apparatus 505 is used to apply the layer of material 501 to the first sheet surface 103 of the glass sheet 101.

Figure 6:
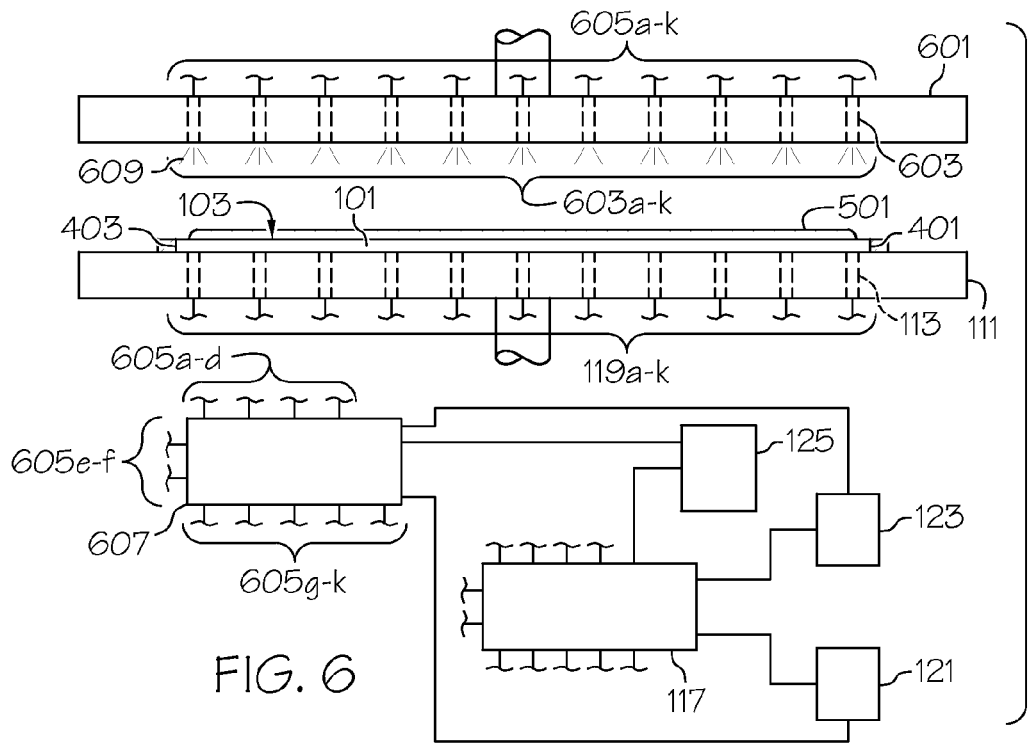
FIG. 6 illustrates initiation of an example step of releasing the glass sheet to relax into a post non-planar shape.

Once the step of applying the layer of material is complete, FIG. 6 illustrates initiation of an example step of releasing the glass sheet to relax into a post non-planar shape. FIG. 6 illustrates just one method that may be used to apply a resistance pressure to slow relaxation of the glass sheet 101 into the post non-planar shape. While a mechanical contact resistance pressure (e.g., by way of the support frame 109) may be used, a contactless apparatus such as an air bearing may be used to help maintain the pristine surfaces of the first sheet surface 103 after application of the material layer. As such, a contactless apparatus, such as the illustrated air pressure plate 601, may be used to facilitate release of the glass sheet to relax the glass sheet into the post non-planar shape.

In one example, an air bearing plate may include a plurality of fluid ports 603 similar or identical to the fluid ports 113 of the vacuum plate 111. Moreover, as discussed with the fluid ports 113 above, some or all of the fluid ports 603*a-k* may be placed in fluid communication by way of fluid conduits 605*a-k* with a manifold 607. Like manifold 117, the manifold 607 may selectively place the fluid ports 603*a-k* in communication with the positive pressure source 121 or the negative pressure source 123. The controller 125 can likewise selectively control the fluid ports 603*a-k* in a similar or identical manner as with the fluid ports 113*a-k*.

The fluid ports 603*a-k* and/or a mechanical contacting technique (e.g., with support frame 109) may be used either alone or in combination with the fluid ports 113*a-k* to control the release of the glass sheet. Controlling the releasing process can prevent the glass sheet 101 from relaxing too quickly that may cause cracking or other failure of the glass sheet due to dynamic stresses that may develop by relaxing too quickly. In one example, the method can include the step of calculating a critical relaxing velocity of the glass sheet 101 where the glass sheet may develop unacceptable levels of dynamic stresses. Such calculation can be provided by solid modeling and/or comparison of measured features of the glass sheet with a database of glass sheets having known critical relaxing velocities to predict the critical relaxing velocity of the glass sheet 101 being processed. One the critical relaxing velocity is achieved, the controller 125 may selectively and independently control the vacuum or positive pressure being applied to each pressure zone, or even each fluid port 113, 603 independently, to control the process of releasing the glass sheet such that the glass sheet 101 does not reach the critical flattening velocity.

Figure 7:
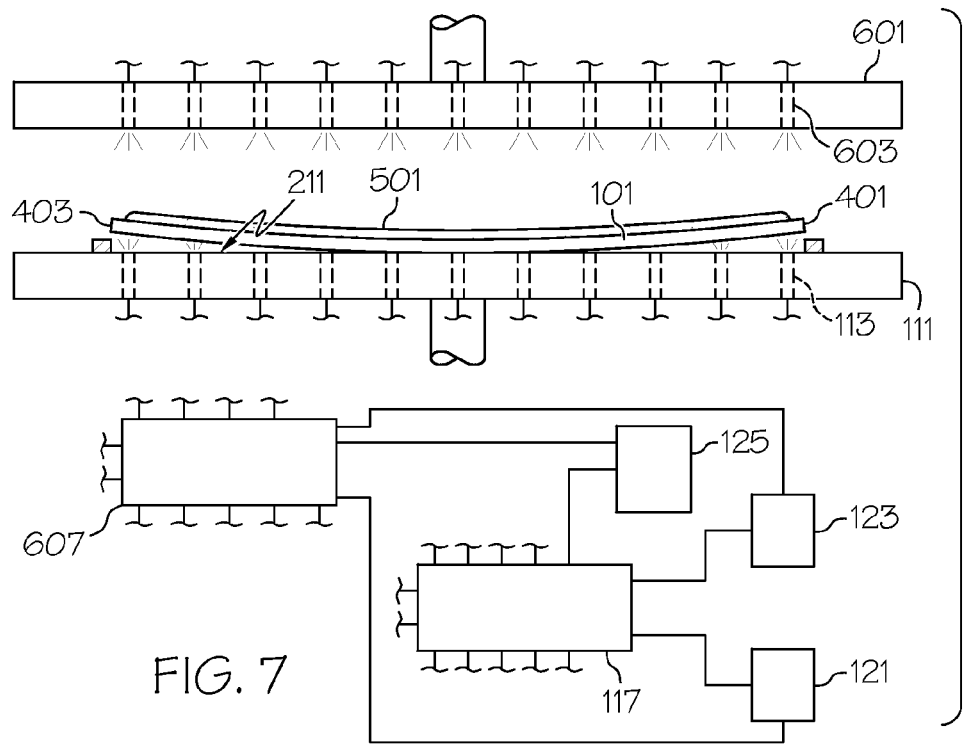
FIG. 7 further illustrates the step of releasing the glass sheet to relax into a post non-planar shape.
Figure 8:
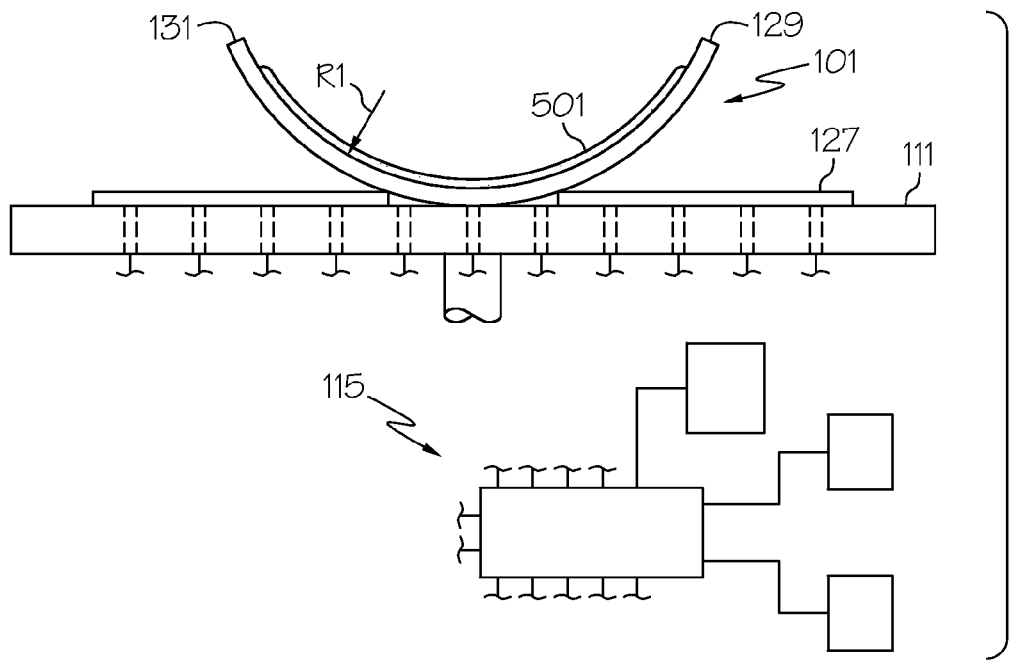
FIG. 8 illustrates the glass sheet being released and in a relaxed post non-planar shape.
Figure 9:
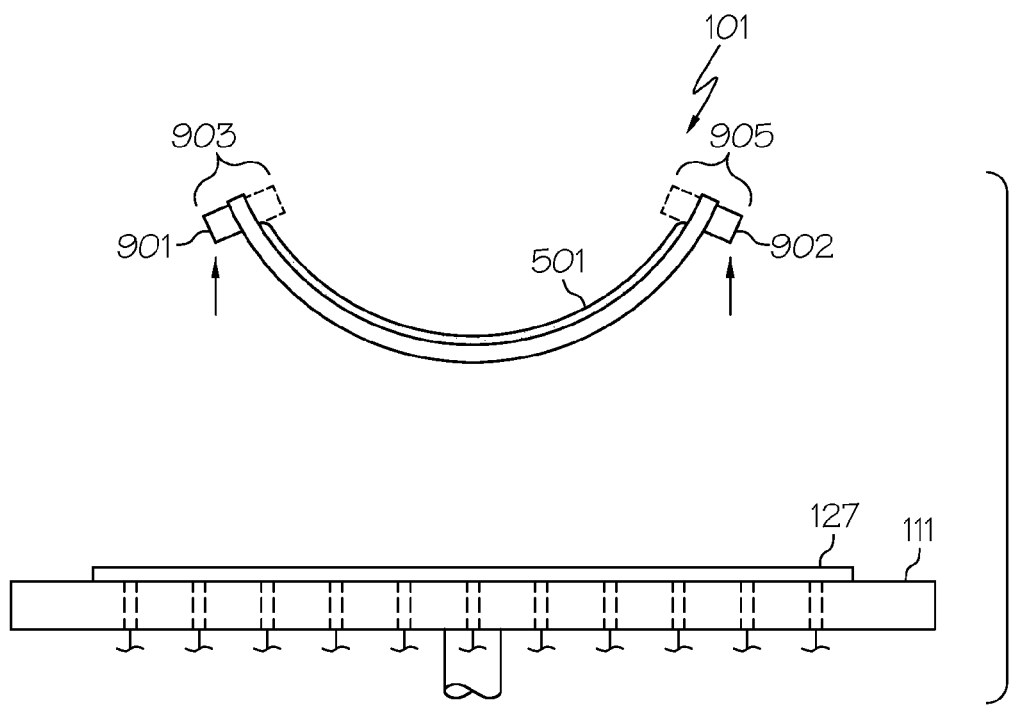
FIG. 9 illustrates an example step of removing the non-planar glass sheet from FIG. 8 from the vacuum plate.

As such, the fluid ports 603*a-k* of FIG. 6 may be placed may be placed under positive pressure to allow fluid 609, such as air, to blow against the layer of material 501 and/or the first sheet surface 103 of the glass sheet 101 to prevent the glass sheet 101 from returning to its post non-planar shape too quickly. For example, the vacuum pressure of the fluid ports 113 may be slowly released while the positive pressure of the fluid ports 603 of the air pressure plate 601 prevent the glass sheet 101 from releasing too quickly. In one example, the opposed fluid ports from the vacuum plate 111 and the air pressure plate 601 can work in concert to help provide an initial controlled release of the outer edges 401, 403 so that the outer edges start lifting from the shaping surface 211 as shown in FIG. 7. Release can continue until the glass sheet 101 reaches a post non-planar shape. In one example, as shown in FIG. 8, the post non-planar shape can be substantially the same shape as the initial non-planar shape illustrated in FIG. 1. However, in further examples, the post non-planar shape may be different than the initial non-planar shape illustrated in FIG. 1 prior to the step of applying the layer of material 501. For example, the glass sheet 101 may have a radius of curvature that is larger in the post non-planar shape than the pre-nonplanar shape. Such a condition may exist from deformation of the glass sheet and/or from the compressive resistance from the layer of material 501 added to the first sheet surface 103. On the other hand, if the glass sheet is not permanently deformed and the resistance from the layer of material is relatively low, the post non-planar shape may be identical or substantially identical to the initial non-planar shape of the glass sheet 101 prior to application of the layer of material.

As shown in FIG. 8, the opposed outer edges 129, 131 are lifted off the vacuum plate 111 to present edge portions of the glass sheet that may be engaged, for example, by a support 901, 902 or a clamping device 903, 905. Once engaged, the glass sheet 101 may be conveniently lifted off the vacuum plate for subsequent processing.

The example method shown in FIGS. 1-9 involves completely flattening the glass sheet 101 into a substantially flat configuration. Such application may be beneficial under certain processing considerations. However, there is a possibility that completely flattening the glass sheet may result in stress failure of the glass sheet. At the same time, the glass sheet may be partially flattened without reaching a critical application shape. In such examples, the 2-D layer application device may still be capable of sufficiently applying the layer of material in the partially flattened position.

In one example, the method can include the step of calculating a critical application shape of the glass sheet 101 where the glass sheet may develop unacceptable levels of stresses due to overshaping the glass sheet. Such calculation can be provided by solid modeling and/or comparison of measured features of the glass sheet with a database of glass sheets having known critical application shapes of a glass sheet can be used to help predict the critical application shape of the glass sheet 101 being processed.

Figure 10:
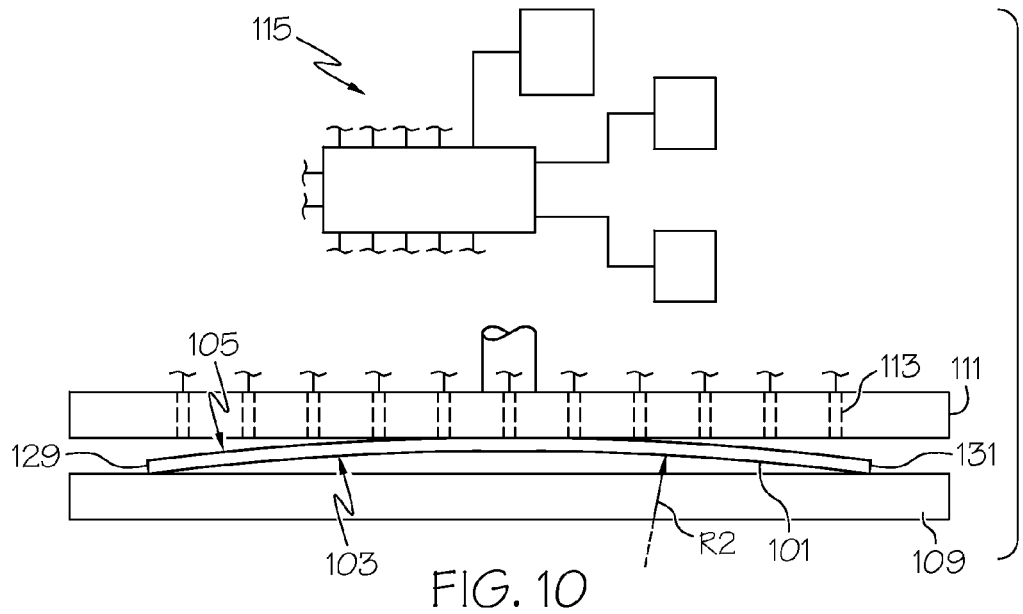
FIG. 10 is another schematic view similar to FIG. 3, but with the glass sheet only partially flattened to an application shape.
Figure 11:
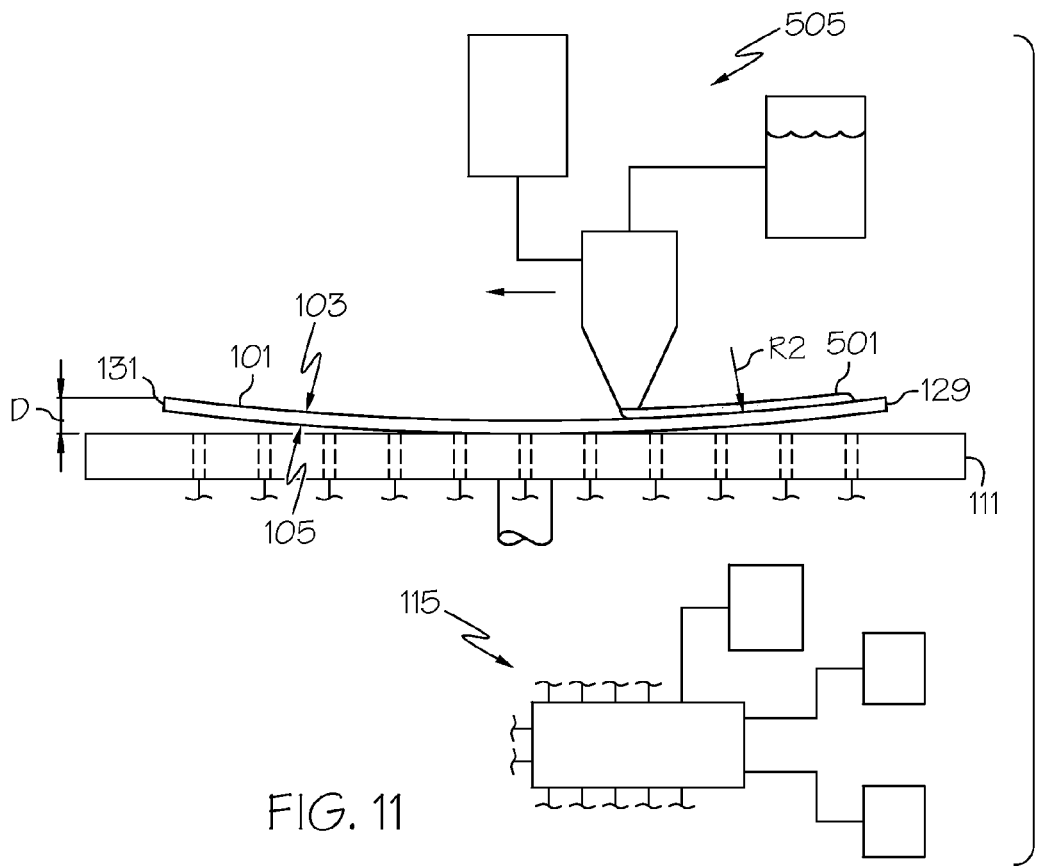
FIG. 11 is a view similar to FIG. 5 wherein the 2-D layer application device is applying a layer of material to a glass sheet with an application shape that is only partially flattened.

If only partial flattening can take place, the method can begin with providing the glass sheet as set forth above, for example, with reference to FIGS. 1 and 2. Next, the method can be carried out similar to FIGS. 3 and 4 but the glass sheet is only partially flattened into an application shape that is less than a critical application shape as shown in FIG. 10. As shown in FIG. 10, once the application shape is achieved, the glass sheet can include an increased radius "R2" when compared to the radius "R1". As such, methods of the present disclosure may only partially flatten the glass sheet to carry out the step of applying the layer of material. Next, as discussed with respect to FIG. 5 above, the support frame 109 or other mechanical device or air bearing may be removed wherein the application shape is maintained by action of the fluid control apparatus and fluid ports 113. As also shown in FIG. 11, the vacuum plate 111 can be reoriented such that the first sheet surface 103 is oriented upward for application of the layer of material 501 by the application apparatus 505. In the illustrated example, a maximum deviation "D" of the second sheet surface 105 in the application orientation is noted. In the illustrated example shown in FIG. 11, the maximum deviation "D" is the difference between the height of the outer edges 129, 131 and the center portion of the first sheet surface 103 in the application shape. The radius "R1" of the non-planar glass sheet 101 can therefore be partially flattened to have a radius "R2" that results in a reduced maximum deviation "D" shown in FIG. 11 that can be less than 6 mm. As such, FIG. 11 shows that the 2-D layer application device 505 may be used to effectively apply the layer of material 501 in a manner similar to the application of the layer discussed with respect to FIG. 5 above.

Figure 12:
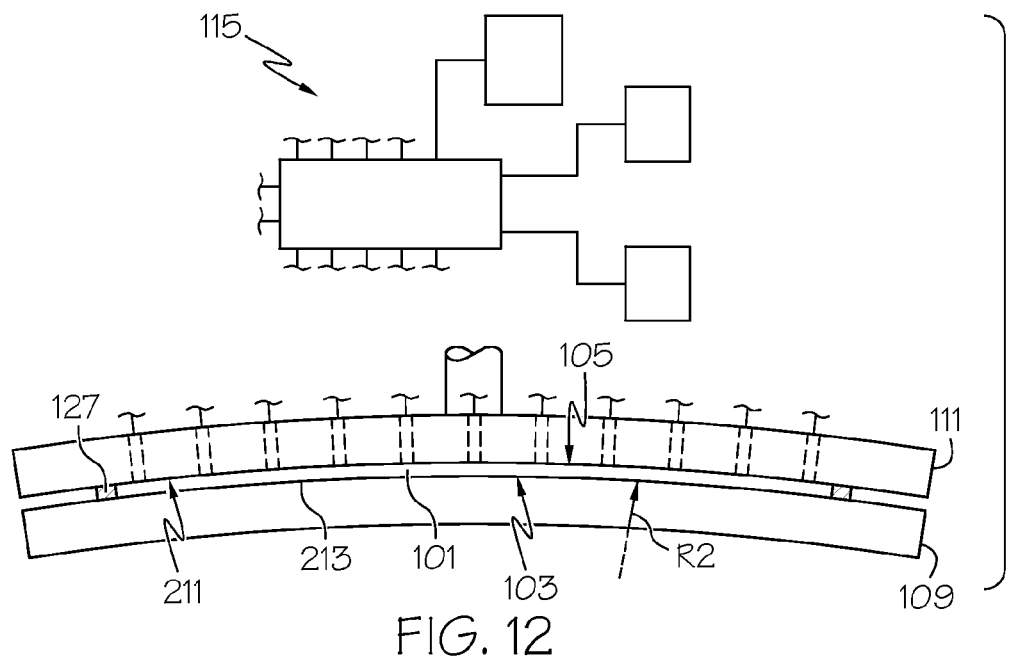
FIG. 12 is another schematic view similar to FIG. 10 wherein a curved vacuum plate and a curved support frame is used to partially flatten the glass sheet into the application shape.
Figure 13:
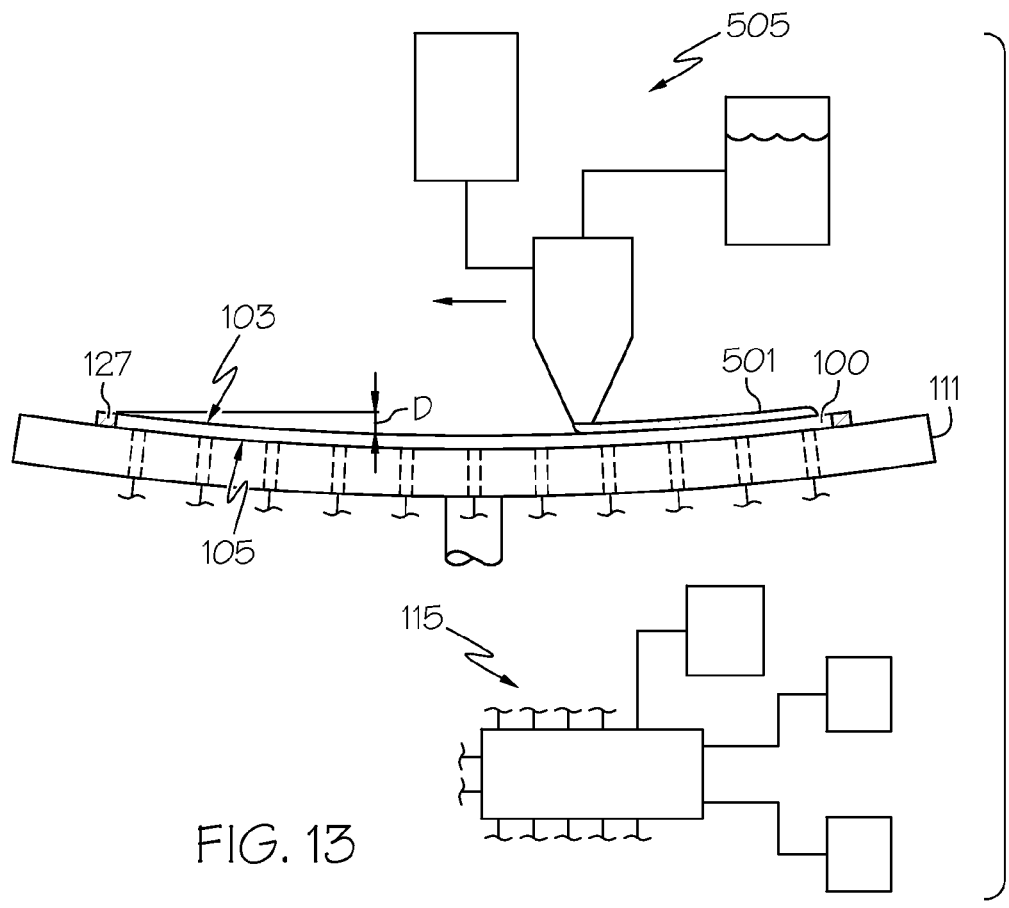
FIG. 13 is a view similar to FIG. 11, wherein the 2-D layer application device is applying a layer of material to the partially flattened glass sheet that is supported by the curved vacuum plate.

FIGS. 12 and 13 illustrate another example of partially flattening the glass sheet 101 into the application shape similar to FIGS. 10 and 11 but using a substantially curved rigid vacuum plate 111 and a substantially curved support frame 109. The method can begin by providing the non-planar glass sheet similar to FIGS. 1 and 2 but with the substantially curved vacuum plate 111 and the substantially curved support frame 109. Next, the method can be carried out similar to FIGS. 3 and 4 but the glass sheet is only partially flattened into an application shape that is less than a critical application shape as shown in FIG. 12. As shown in FIG. 12, the glass sheet can be vacuum formed against the curved shaping surface 211 and within the vacuum pocket 213 defined by the seal 127. Once the application shape is achieved, the glass sheet can also include an increased radius "R2" when compared to the radius "R1". As such, methods of the present disclosure may only partially flatten the glass sheet as shown in FIGS. 10 and 12 to carry out the step of applying the layer of material. Next, as discussed with respect to FIGS. 5 and 11 above, the support frame 109 or other mechanical device or air bearing may be removed wherein the application shape is maintained by action of the vacuum forming of the glass sheet to the curved shaping surface 211 of the vacuum plate 111. As also shown in FIG. 11, the curved vacuum plate 111 can be reoriented such that the first sheet surface 103 is oriented upward for application of the layer of material by the application apparatus 505. In the illustrated example, a maximum deviation "D" of the first sheet surface 103 in the application orientation is noted. As likewise shown in FIG. 11, the maximum deviation "D" is the difference between the height of the outer edges 129, 131 and the center portion of the first sheet surface 103 in the application shape. The radius "R1" of the non-planar glass sheet 101 can therefore be partially flattened to have a radius "R2" that results in a reduced maximum deviation "D" shown in FIG. 11 that can be less than 6 mm. As such, FIG. 13 shows that the 2-D layer application device 505 may be used to effectively apply the layer of material 501 in a manner similar to the application of the layer discussed with respect to FIG. 5 above.

Figure 14:
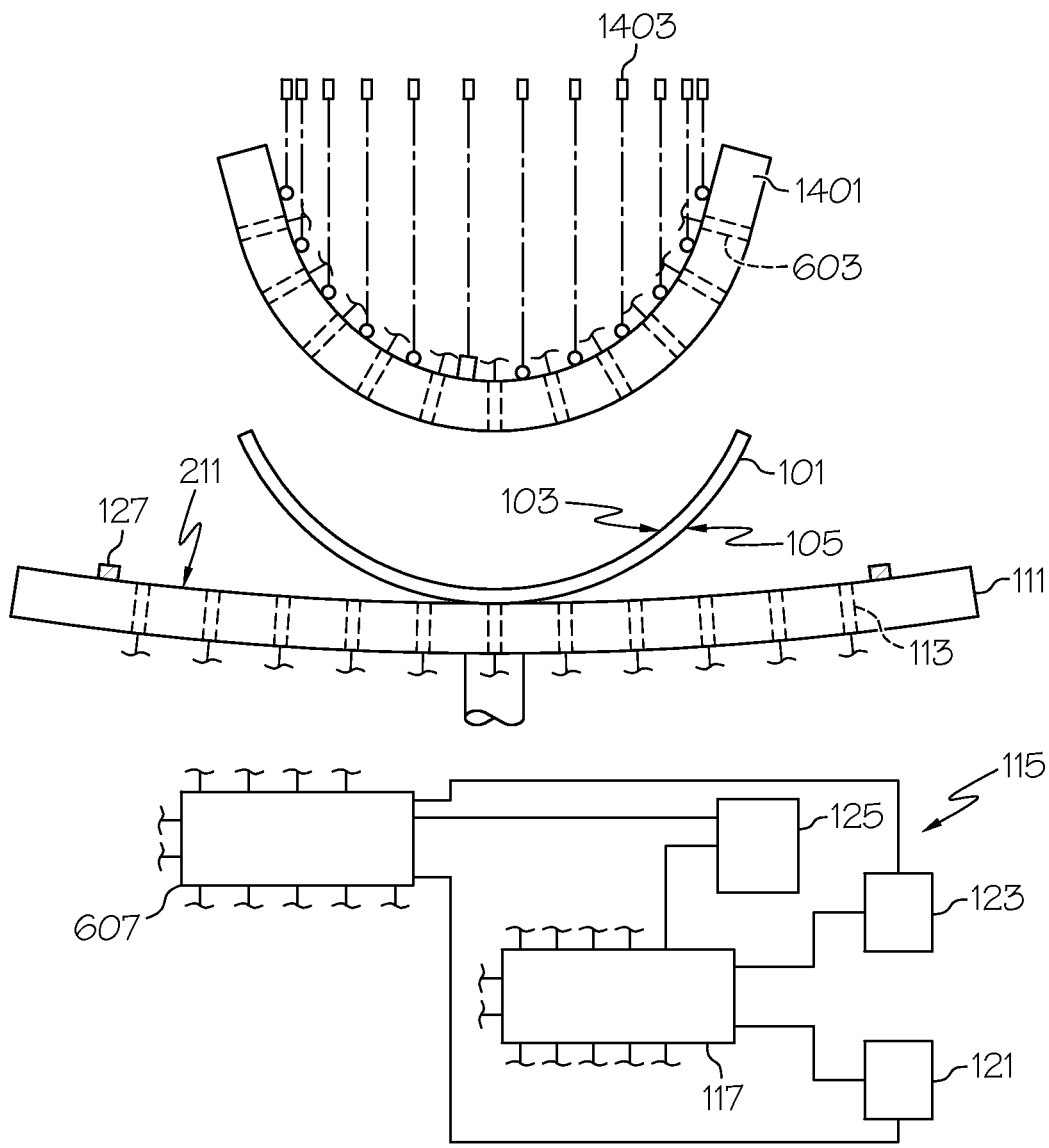
FIG. 14 illustrates using a flexible air bearing to assist with partial flattening of the glass sheet against a curved vacuum plate.

As discussed in the above examples, FIG. 14 illustrates another example of at least partially flattening a glass sheet where the second sheet surface 105 is placed against the curved vacuum plate 111. In this example, a flexible air bearing 1401, such as a flexible membrane, may be used to facilitate partial flattening of the glass sheet. In such examples, a plurality of actuators 1403 may be used to selectively control the shape of the flexible air bearing as the flexible air bearing moves toward the first sheet surface 103 of the glass sheet 101. The flexible air bearing includes a plurality of fluid ports 1405 similar to the fluid ports 603 discussed with respect to the embodiment of FIG. 6. As such the fluid ports 603 that may be controlled by the fluid control apparatus 115 similar or identical to the fluid ports 603 discussed with FIG. 6. In the example, shown in FIG. 14, the actuators 1403 can cause the flexible air bearing 1401 to change shape during the step of partially flattening the glass sheet 101 against the curved shaping surface 211 of the curved vacuum plate 111 similar to the way the glass sheet was partially flattened in FIG. 12. However, like FIG. 6, the flexible air bearing 1401 can provide a touchless assist with flattening the glass sheet into the application shape to maintain the first sheet surface 103 in a pristine condition.

Figure 15:
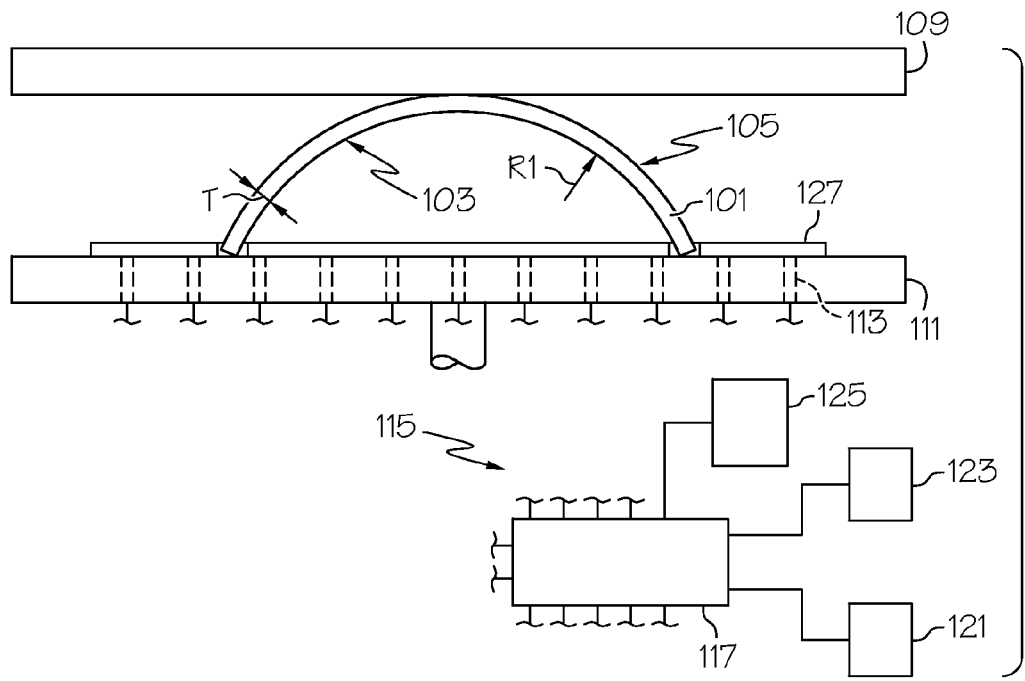
FIG. 15 is another schematic view of another example method step of providing a glass sheet having an initial non-planar shape prior to the step of at least partially flattening the glass sheet into an application shape.
Figure 16:
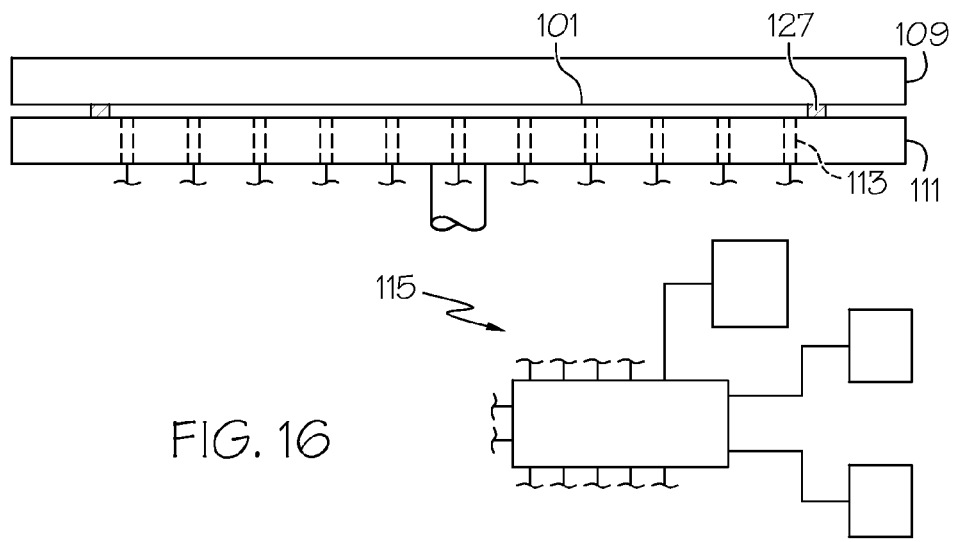
FIG. 16 illustrates the non-planar glass sheet of FIG. 15 being flattened into a substantially planar application shape.
Figure 17:
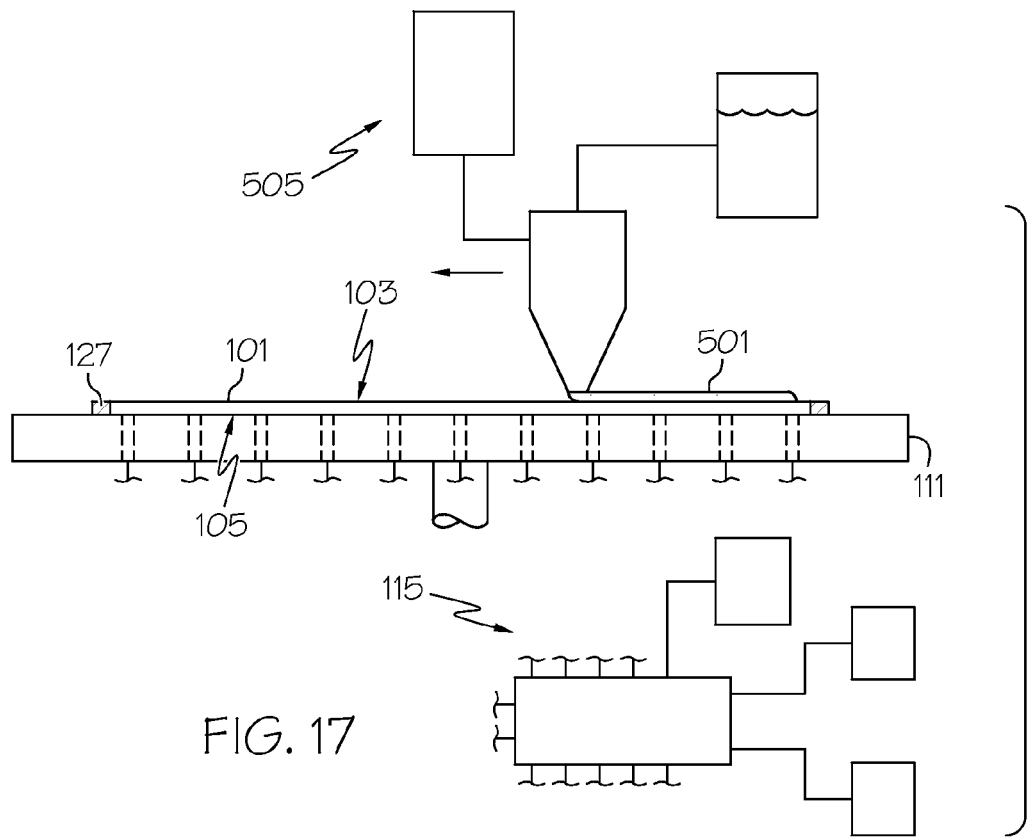
FIG. 17 illustrates a step of applying a layer of material to the second sheet surface of the glass sheet while the glass sheet is in the application shape.
Figure 18:
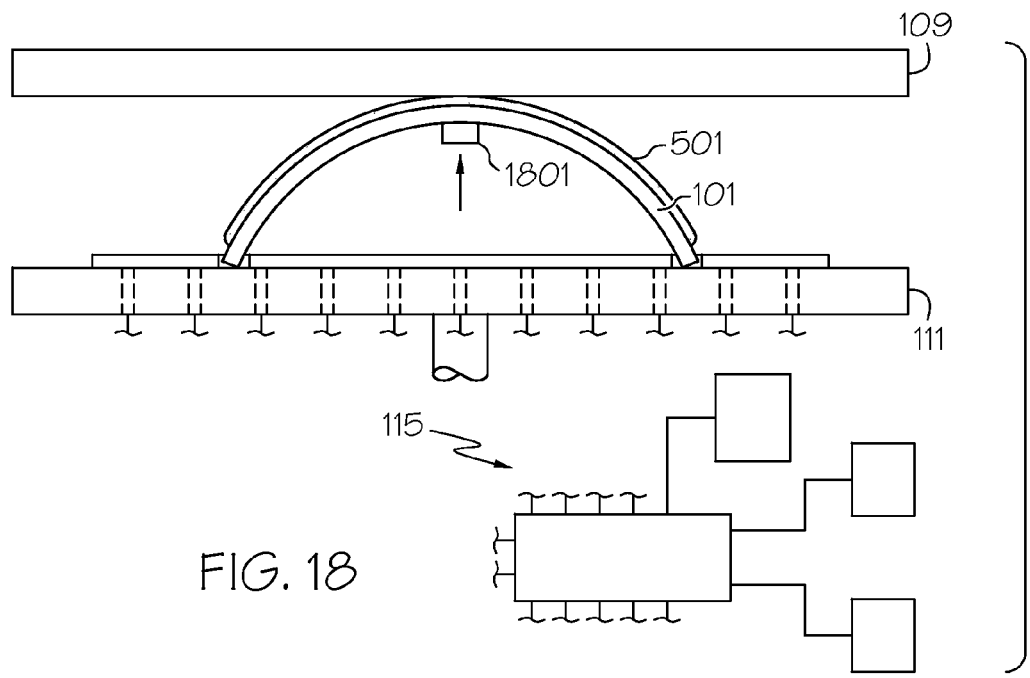
FIG. 18 illustrates the glass sheet of FIG. 17 being released and removed from the vacuum plate.

As with any of the embodiments of the present application, the layer of material may be applied to either side of the glass sheet (e.g., the concave or the convex side). FIGS. 1-14 illustrate example methods of applying a layer of material to a concave side of the glass sheet. FIGS. 15-18 illustrate just one example of applying a layer of material to the convex side of the nonplanar glass sheet. For example, as shown in FIG. 15, the non-planar glass sheet 101 can be provided in the same orientation shown in FIG. 1 but non-planar glass sheet 101 is placed such that the first sheet surface 103 faces the vacuum plate 111 positioned underneath the non-planar glass sheet 101. Next, as shown in FIG. 16, the glass sheet 101 can be flattened such that the glass sheet is vacuum formed into the vacuum pocket as discussed with respect to FIGS. 3 and 4 above. Then the 2-D layer application apparatus 505 can be used to apply the layer of material 501 to the first sheet surface 103 similar to the method discussed with respect to FIG. 5 above.

Once the layer of material 501 is applied, the support frame 109 (or air bearing) may be used to assist in controlling the release of the glass sheet to help prevent the glass sheet from relaxing too quickly. Finally, a lift device 1801 may be used to remove the glass sheet 101 from the vacuum plate 111.

Figure 19:
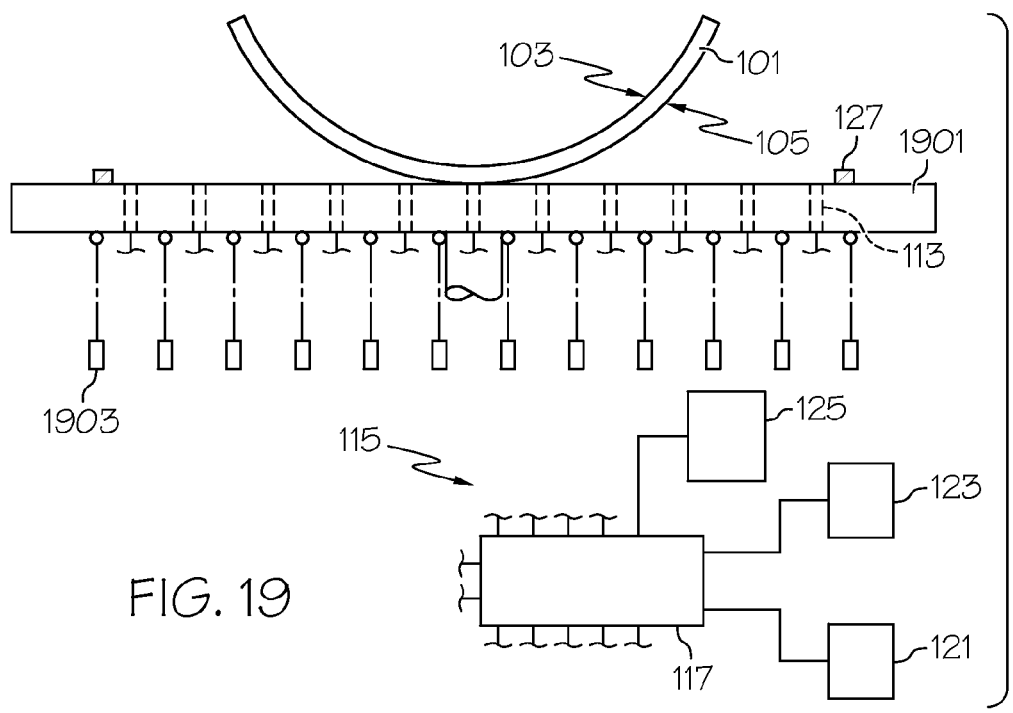
FIG. 19 is a schematic view of another example method step of providing a glass sheet having an initial non-planar shape prior to the step of at least partially flattening the glass sheet into an application shape.

FIGS. 19-23 illustrate another method of using a flexible vacuum plate without a support frame (or further air bearing) to flatten the non-planar glass sheet 101. Such method, as with many of the methods herein, can be used or modified to be used to print on either surface of the non-planar glass sheet (e.g., the concave or convex surface). For example, as shown in FIG. 19, the glass sheet 101 may be placed such that the second sheet surface 105 comprising the convex surface is engaging the flexible vacuum plate 1901. The flexible vacuum plate 1901 can include a plurality of fluid ports 113 that may operate with the fluid control apparatus 115 in a manner similar to that discussed with respect to FIG. 1 above. The flexible vacuum plate 1901 can include a plurality of actuators 1903 configured to selectively change the shape of the flexible vacuum plate 1901.

Figure 20:
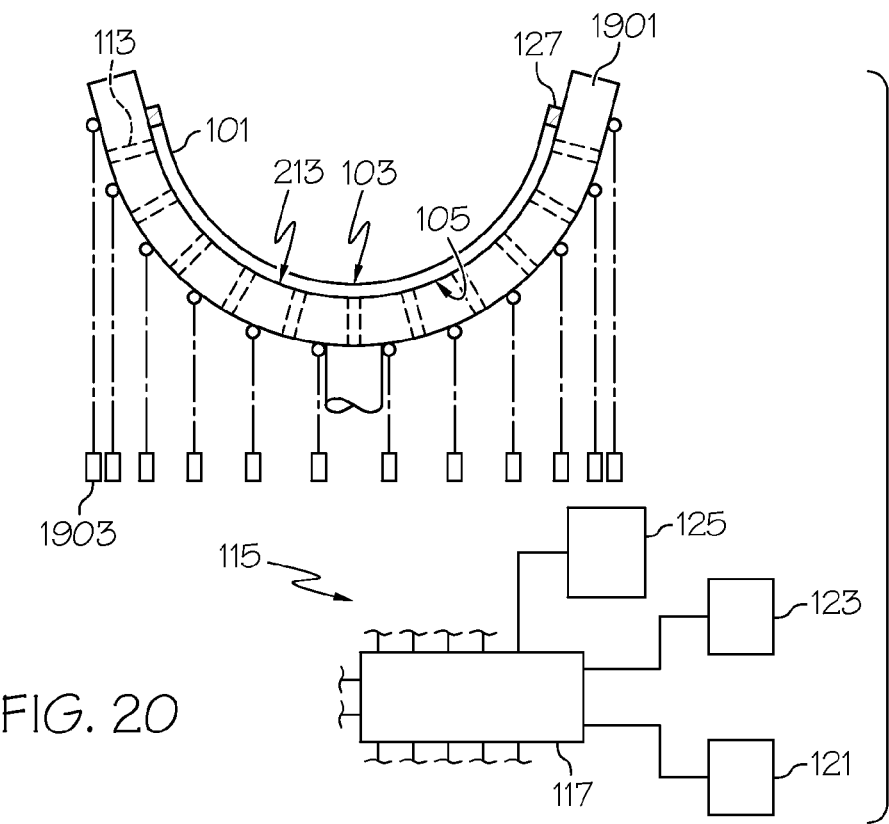
FIG. 20 is a schematic view of a flexible vacuum plate being shaped to substantially match the initial non-planar shape of the glass sheet.

As shown in FIG. 20, the flexible vacuum plate 1901 can then be shaped by the actuators 1903 to have a shape that matches the shape of the non-planar glass sheet 101 such that the glass sheet is received within the vacuum pocket 213 defined by the seal 127. Next, the fluid ports 113 can vacuum form the glass sheet 101 into the vacuum pocket 213.

Figure 21:
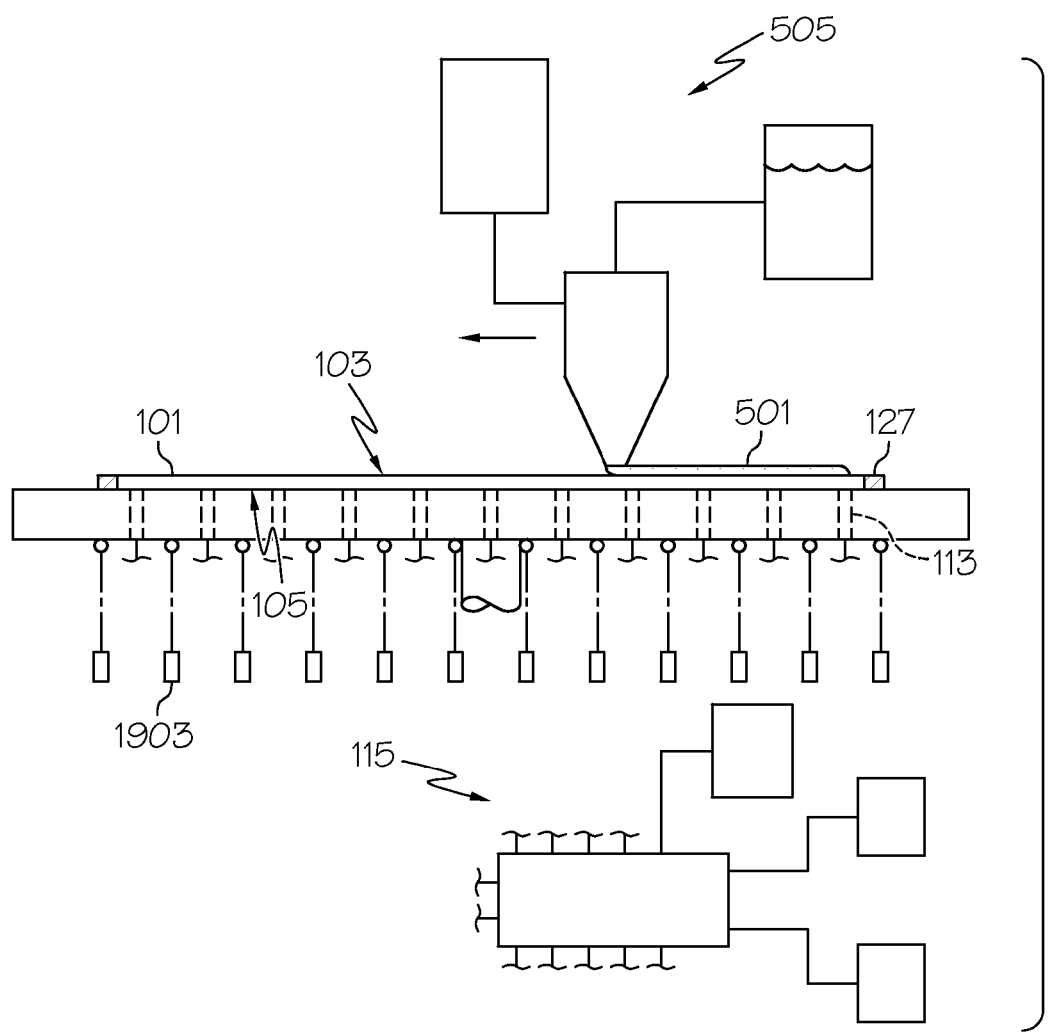
FIG. 21 illustrates the method of flattening the glass sheet of FIG. 20 and applying a layer of material to the glass sheet.

As shown in FIG. 21, the actuators 1903 can then at least partially flatten (such as entirely flatten as shown in FIG. 21) the glass sheet such that the layer application apparatus 505 applies a layer of material 501 to the first sheet surface 103 of the glass sheet 101.

Figure 22:
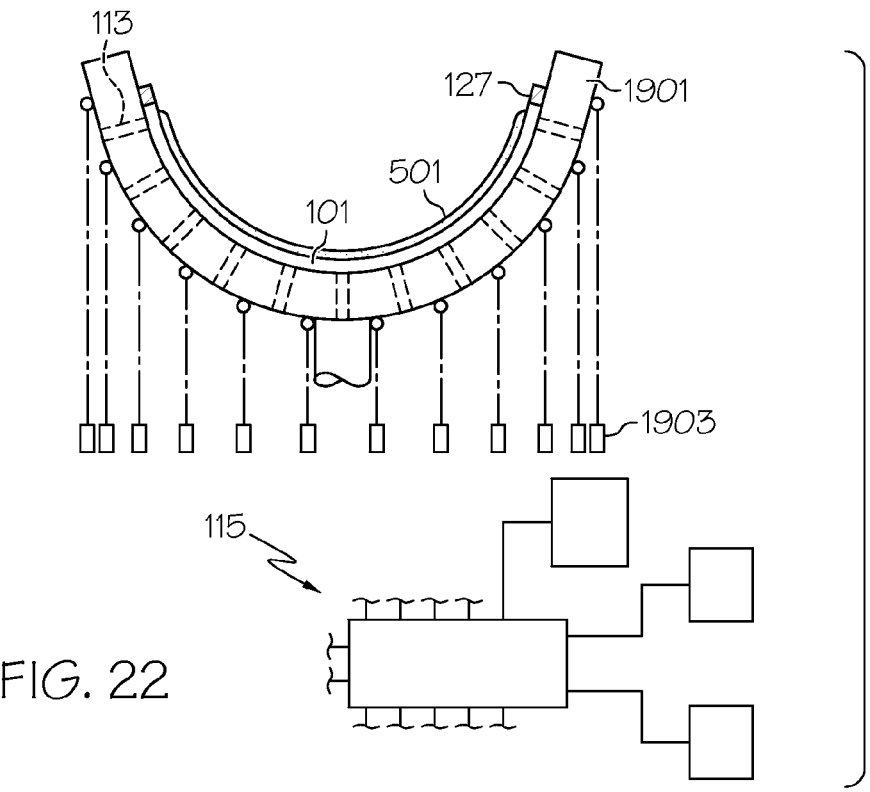
FIG. 22 is illustrates a step of returning the glass sheet to a post non-planar shape after application of the layer of material.

After application of the layer of material 501, as shown in FIG. 22, the actuators 1903 can then reshape the glass sheet 101 to the initial non-planar shape in a controlled manner to reduce stress associated with uncontrolled release of the glass sheet 101. Then, as shown in FIG. 23, the fluid control apparatus 115 can remove the vacuum force from the fluid ports 113 and then the actuators 1903 can cause the flexible vacuum plate 1901 to withdraw from the non-planar glass sheet 101.

Figure 23:
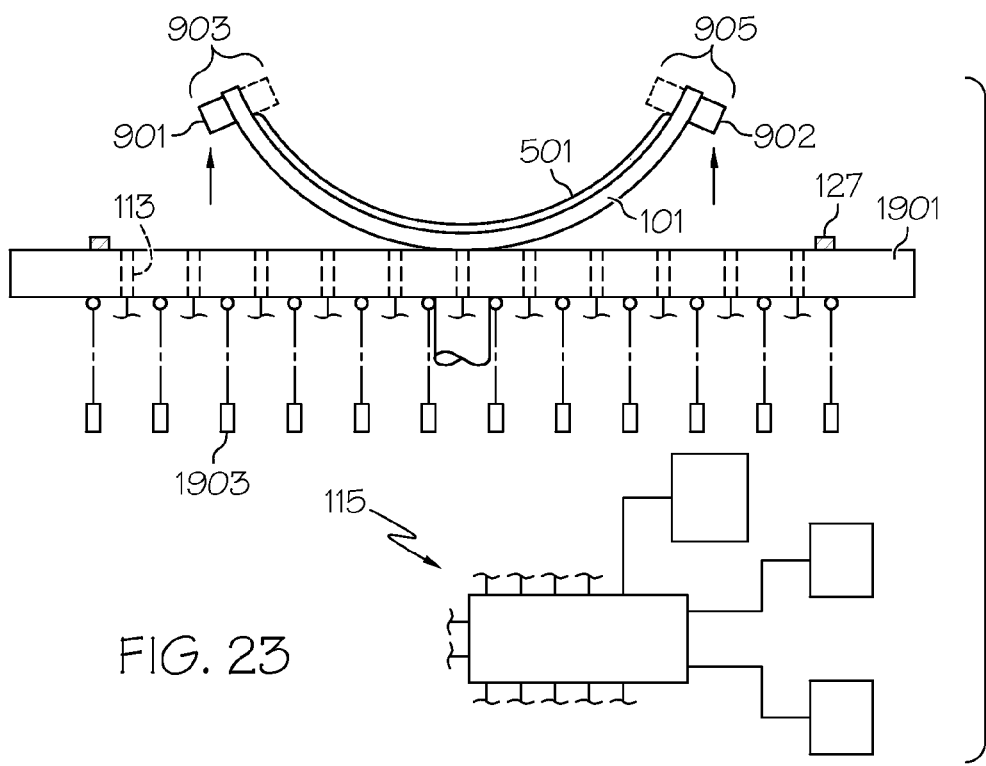
FIG. 23 illustrates the flexible vacuum plate being withdrawn to release the glass sheet and the step of positioning supports to lift the glass sheet off the flexible vacuum plate.

As also shown in FIG. 23, the opposed outer edges of the glass sheet 101 are lifted off the flexible vacuum plate 1901, for example, by the support 901, 902 or the clamping device 903, 905. Once engaged, the glass sheet 101 may be conveniently lifted off the flexible vacuum plate for subsequent processing.

Figure 24:
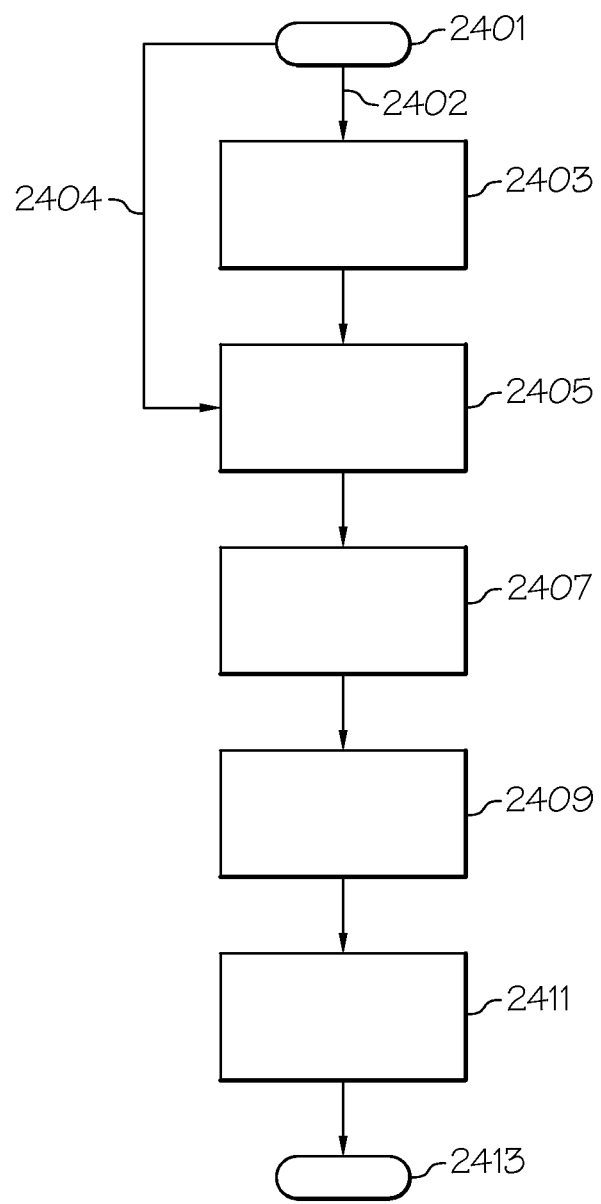
FIG. 24 is a flow chart illustrating example steps in accordance with aspects of the disclosure.

FIG. 24 illustrates an example flow chart of methods in accordance with aspects of the present invention. The method may start at location 2401 and then, as shown by arrow 2402, may optionally calculate various process limitations at step 2403. For example, the maximum flattening permissible may be determined by solid modeling to determine if the glass sheet may be completely flattened into a planar orientation without damaging the glass sheet 101. Step 2403 can also determine the maximum flattening and/or relaxing velocity of the glass sheet to determine if the process needs to control the at least partial flattening and/or the relaxing of the glass sheet to avoid damaging the glass sheet 101.

Alternatively, if the design limitations of the glass sheet 101 are already known, the process may circumvent the step 2403 of calculating various process limitations as indicated by arrow 2404. The method may then continue with the method step 2405 of providing the glass sheet 101 having an initial non-planar shape including a thickness defined between a first sheet surface and a second sheet surface. The method may then continue with step 2407 of at least partially flattening the glass sheet into an application shape. In one example, the glass sheet is completely flattened such that the glass sheet comprises a substantially planar glass sheet. In further examples, the glass sheet is partially flattened. The step of at least partially flattening may include application of forces (either mechanically or touchless) to the first side only, the second side only, or both sides.

The method may then continue to step 2409 of applying the layer of material to the first sheet surface while the glass sheet is in the application shape. The first sheet surface can comprise either side of the glass sheet. For example, the first sheet surface can comprise either a concave surface or a convex surface in accordance with any of the aspects of the disclosure. As such, methods of the disclosure can apply a layer of material to either side of the glass sheet (e.g., convex or concave side).

The method may then continue with step 2411 of releasing the glass sheet 101 to relax the glass sheet into a post non-planar shape. In one example, the post non-planar shape may be substantially equal to the initial non-planar shape although the post non-planar shape may be different in further examples.

Once released, support devices and/or clamping devices may engage raised portions of the glass sheet to complete the process as indicated by step 2413.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of applying a layer of material to a glass sheet having a non-planar shape comprising the steps of:
    (I) providing the glass sheet having an initial non-planar shape including a thickness defined between a first sheet surface and a second sheet surface and providing a vacuum plate with a shaping surface and a seal circumscribing the shaping surface and defining a vacuum pocket;
    (II) vacuum forming the glass sheet against the shaping surface of the vacuum plate and within the vacuum pocket to at least partially flatten the glass sheet into an application shape;
    (III) applying the layer of material to the first sheet surface while the glass sheet is in the application shape; and then
    (IV) releasing the glass sheet to relax into a post non-planar shape, wherein the glass sheet is provided with an interrupted interior surface including at least one opening that is sealed when forming the glass sheet within the vacuum pocket.

2. The method of claim 1, wherein step (II) substantially flattens the glass sheet such that the application shape is substantially planar.

3. The method of claim 1, wherein step (II) flattens the glass to an extent sufficient to enable step (III) of applying of the layer of material to the first sheet surface while the glass sheet is in the application shape by at least one of screen printing or ink jet printing.

4. The method of claim 1, further comprising the step of applying fluid pressure to the glass sheet to maintain the glass sheet in the application shape during step (III).

5. The method of claim 1, wherein step (II) includes the step of applying fluid pressure to the glass sheet to at least partially flatten the glass sheet into the application shape.

6. The method of claim 5, wherein step (II) includes the step of operating a plurality of fluid ports to apply fluid pressure to the glass sheet to at least partially flatten the glass sheet into the application shape.

7. The method of claim 6, further including the step of independently operating the plurality of fluid ports to selectively apply different corresponding pressures to the glass sheet to at least partially flatten the glass sheet during step (II).

8. The method of claim 1, further comprising the step of applying a positive pressure to the first sheet surface to push the glass sheet to at least partially flatten the glass sheet into the application shape.

9. The method of claim 1, further comprising the step of applying a negative pressure to the second sheet surface to pull the glass sheet to at least partially flatten the glass sheet into the application shape.

10. The method of claim 1, wherein step (II) includes mechanically engaging the glass sheet with a mechanical assist to at least partially assist in at least partially flattening the glass sheet into the application shape.

11. The method of claim 10, further comprising the step of moving the mechanical assist out of engagement with the glass sheet such that a fluid pressure maintains the glass sheet in the application shape during step (III).

12. The method of claim 1, wherein the shaping surface of the vacuum plate is substantially flat, such that step (II) includes vacuum forming the glass sheet against the shaping surface into the application shape that is substantially planar.

13. The method of claim 1, wherein the opening is sealed with an interior seal when forming the glass sheet within the vacuum pocket.

14. The method of claim 1, wherein step (IV) provides the post non-planar shape with substantially the same shape as the initial non-planar shape.

15. The method of claim 1, wherein the step (I) provides the glass sheet as an ion-exchange strengthened glass sheet in the initial non-planar shape.

16. The method of claim 1, wherein step (IV) comprises slowing the rate that the glass sheet is relaxed into the post non-planar shape.

17. The method of claim 16, further comprising the step of applying a resistance pressure to slow relaxation of the glass sheet into the post non-planar shape during step (IV).

18. The method of claim 16, further comprising the step of calculating a critical relaxing velocity of the glass sheet, wherein the step (IV) slows the rate that the glass sheet is relaxed such that the glass sheet does not reach the critical relaxing velocity.

19. The method of claim 1, further comprising the step of calculating a critical flattening velocity of the glass sheet, wherein the step (II) controls the process of at least partially flattening the glass sheet such that the glass sheet does not reach the critical flattening velocity.

20. The method of claim 1, further comprising the step of calculating a critical application shape, wherein step (II) at least partially flattens the glass sheet into an application shape that does not reach the critical application shape.

21. The method of claim 1, further comprising the step of providing a printing device, wherein step (III) applies the layer of material to the first surface of the glass sheet with the printing device.

22. The method of claim 21, wherein the printing device is provided that is not configured to apply a layer of material to the first surface of the glass sheet when the glass sheet is in the initial non-planar shape.

23. The method of claim 1, wherein step (I) provides one of the first and second sheet surface as a concave surface and the other of the first and second sheet surface as a convex surface.

24. The method of claim 1, wherein the glass sheet is provided with an interrupted interior surface including at least one opening.

25. The method of claim 24, wherein the opening is entirely closed within an outer periphery of the glass sheet.

26. A method of applying a layer of material to a glass sheet having a non-planar shape comprising the steps of:
   (I) providing the glass sheet having an initial non-planar shape including a thickness defined between a first sheet surface and a second sheet surface;
   (II) at least partially flattening the glass sheet into an application shape;
   (III) applying the layer of material to the first sheet surface while the glass sheet is in the application shape; and then
   (IV) releasing the glass sheet to relax into a post non-planar shape, wherein step (IV) provides the post non-planar shape with substantially the same shape as the initial non-planar shape.

\* \* \* \* \*